US007890753B2

(12) United States Patent
Dahan et al.

(10) Patent No.: US 7,890,753 B2
(45) Date of Patent: Feb. 15, 2011

(54) SECURE MODE FOR PROCESSORS SUPPORTING MMU AND INTERRUPTS

(75) Inventors: Franck Dahan, Nice (FR); Christian Roussel, Valbonne (FR); Alain Chateau, Cagnes sur Mer (FR); Peter Cumming, La Gaude (FR)

(73) Assignee: Texas Instruments Incorporated, Dallas, TX (US)

( * ) Notice: Subject to any disclaimer, the term of this patent is extended or adjusted under 35 U.S.C. 154(b) by 3008 days.

(21) Appl. No.: 10/256,642

(22) Filed: Sep. 27, 2002

(65) Prior Publication Data

US 2003/0140245 A1    Jul. 24, 2003

(30) Foreign Application Priority Data

Jan. 16, 2002  (EP)  .................................. 02290115
Jun. 20, 2002  (EP)  .................................. 02100727

(51) Int. Cl.
*H04L 29/06*    (2006.01)
(52) U.S. Cl. ...................................................... 713/164
(58) Field of Classification Search .................. 713/164
See application file for complete search history.

(56) References Cited

U.S. PATENT DOCUMENTS

| 4,590,552 | A | * | 5/1986 | Guttag et al. ................ 711/163 |
| 5,251,304 | A | | 10/1993 | Sibigtroth et al. |
| 5,615,263 | A | * | 3/1997 | Takahashi .................... 713/164 |
| 5,684,948 | A | | 11/1997 | Johnson et al. |

(Continued)

OTHER PUBLICATIONS

ARM—The Architecture for the Digital World; *ARM926EJ-S Jazelle-Enhanced Microcell*, www.arm.com/armtech/ARM926EJ_S?OpenDocument; 3 pgs.

*Primary Examiner*—Farid Homayounmehr
(74) *Attorney, Agent, or Firm*—Robert D. Marshall, Jr.; W. James Brady; Frederick J. Telecky, Jr.

(57) ABSTRACT

A digital system is provided with a secure mode ($3^{rd}$ level of privilege) built in a non-invasive way on a processor system that includes a processor core, instruction and data caches, a write buffer and a memory management unit. A secure execution mode is thus provided on a platform where the only trusted software is the code stored in ROM. In particular the OS is not trusted, all native applications are not trusted. A secure execution mode is provided that allows virtual addressing when a memory management unit (MMU) is enabled. The secure execution mode allows instruction and data cache to be enabled. A secure execution mode is provided that allows all the system interruptions to be unmasked. The secure mode is entered through a unique entry point. The secure execution mode can be dynamically entered and exited with full hardware assessment of the entry/exit conditions. A specific set of entry conditions is monitored that account for caches, write buffer and MMU being enabled. The structure of the activation sequence code accounts for caches, write buffer and MMU being enabled. The structure of the exit sequences code accounts for caches, write buffer and MMU being enabled. A specific way is provided to manage a safe exit of secure mode under generic interruptions and allows return from interruption through entry point and activation sequence and a proper resuming of the secure execution. A specific way is provided to manage the MMU in secure mode and provide data exchange between secure and non-secure environment.

12 Claims, 10 Drawing Sheets

U.S. PATENT DOCUMENTS

| | | | |
|---|---|---|---|
| 5,710,814 A * | 1/1998 | Klemba et al. | 713/173 |
| 5,737,760 A | 4/1998 | Grimmer, Jr. et al. | |
| 6,282,657 B1 * | 8/2001 | Kaplan et al. | 726/1 |
| 6,507,904 B1 * | 1/2003 | Ellison et al. | 712/229 |
| 2002/0048369 A1 * | 4/2002 | Ginter et al. | 380/277 |

* cited by examiner

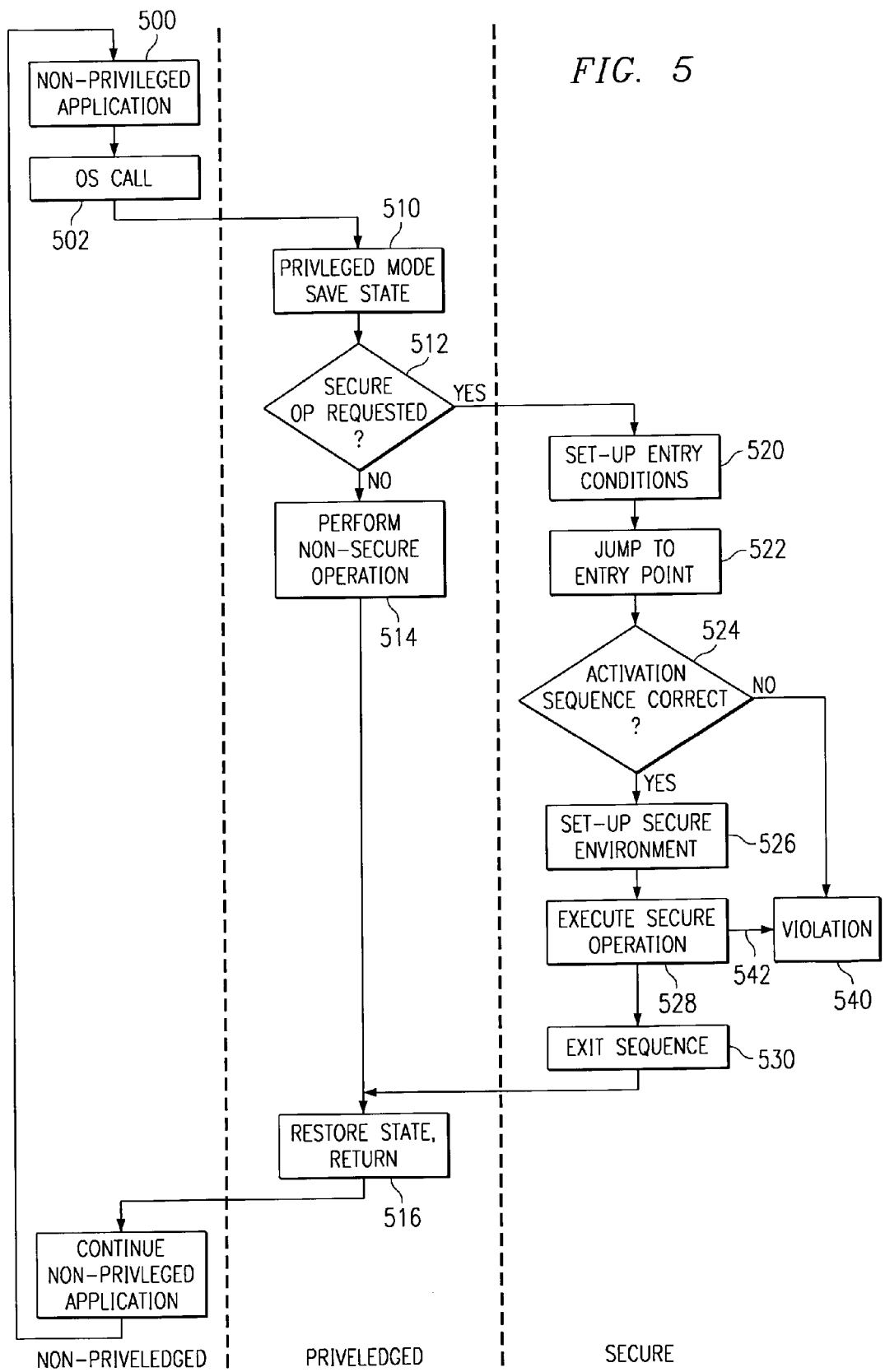

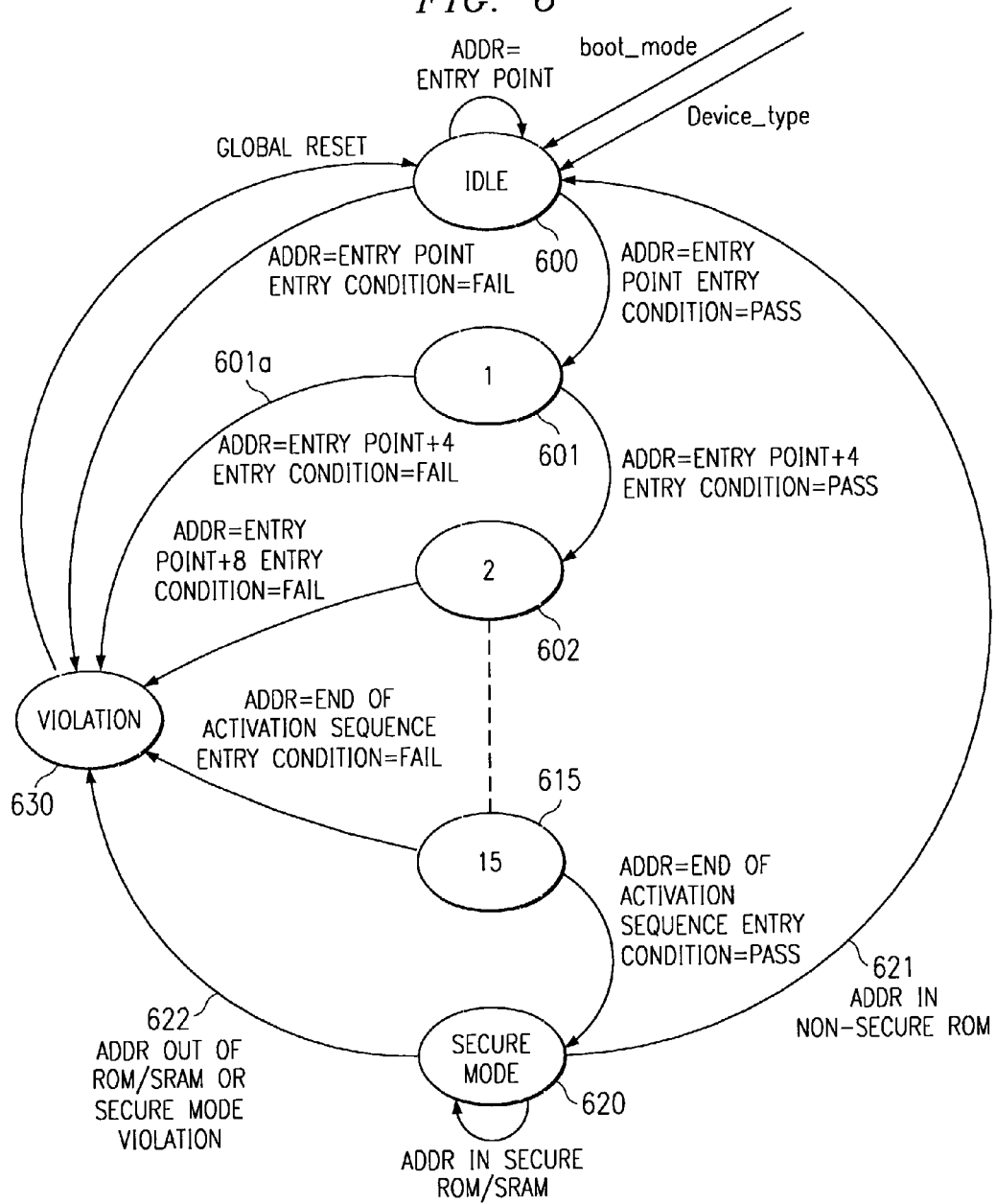

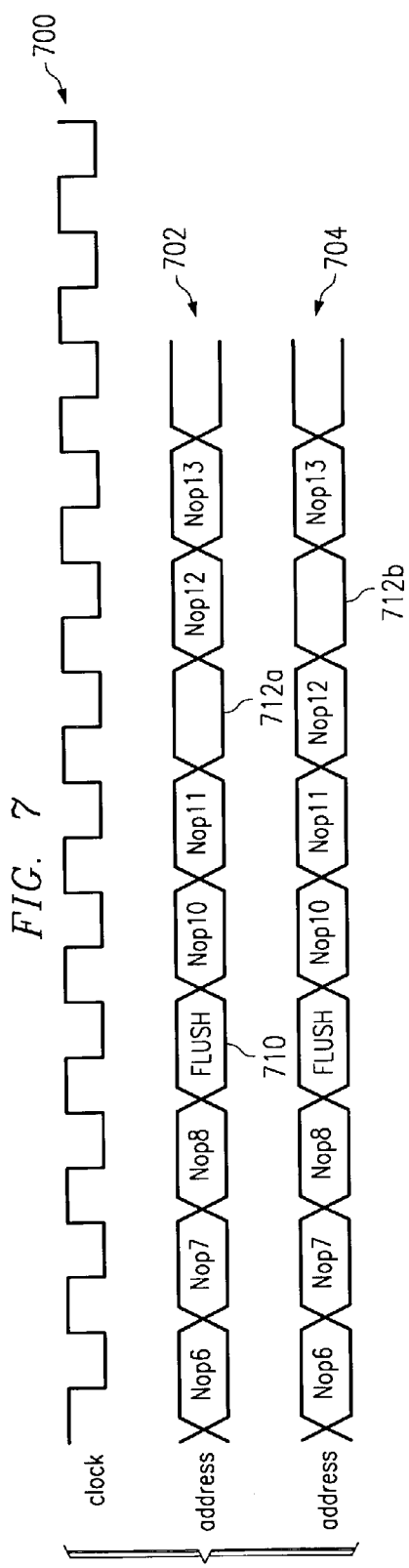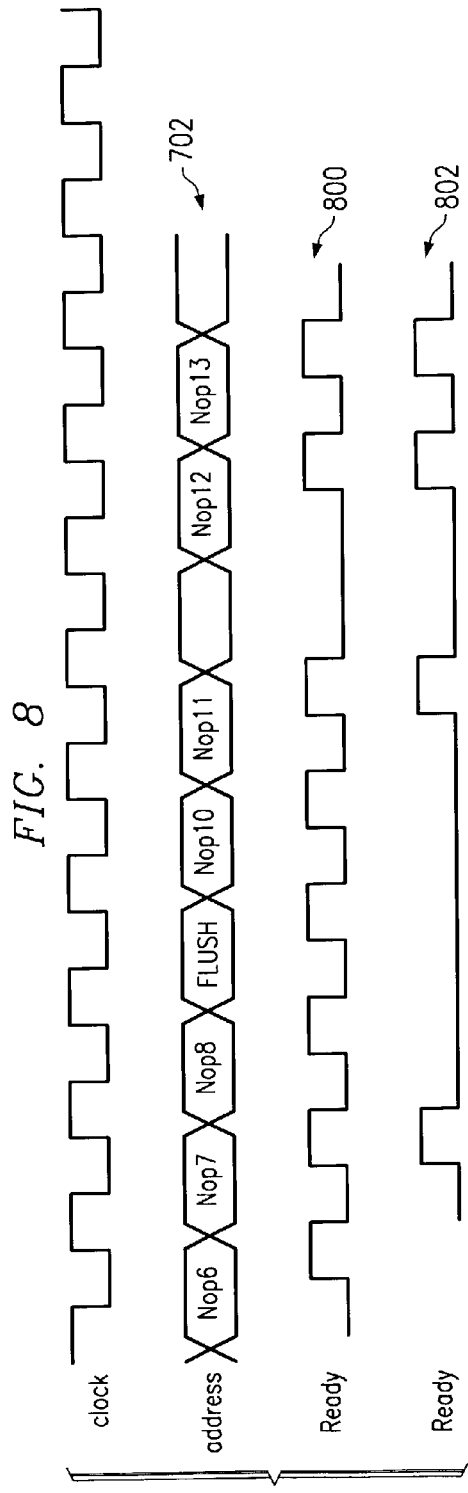

SECURE MODE FOR PROCESSORS SUPPORTING MMU AND INTERRUPTS

This application incorporates by reference and claims priority under 35 USC 119(a) to European patent application Serial Number 02290115.1, filed Jan. 16, 2002 entitled Secure Mode For Processors Supporting MMU And Interrupts and European patent application Serial Number 02100727.3, filed Jun. 30, 2002 entitled Secure Mode For Processors Supporting MMU And Interrupts.

FIELD OF THE INVENTION

This invention generally relates to microprocessors, and more specifically to improvements in security mechanisms to support secure software services.

BACKGROUND OF THE INVENTION

Microprocessors are general-purpose processors that provide high instruction throughputs in order to execute software running thereon, and can have a wide range of processing requirements depending on the particular software applications involved. Many different types of processors are known, of which microprocessors are but one example. For example, Digital Signal Processors (DSPs) are widely used, in particular for specific applications, such as mobile processing applications. DSPs are typically configured to optimize the performance of the applications concerned and to achieve this they employ more specialized execution units and instruction sets. Particularly in applications such as mobile telecommunications, but not exclusively, it is desirable to provide ever-increasing DSP performance while keeping power consumption as low as possible.

To further improve performance of a digital system, two or more processors can be interconnected. For example, a DSP may be interconnected with a general-purpose processor in a digital system. The DSP performs numeric intensive signal processing algorithms while the general-purpose processor manages overall control flow. The two processors communicate and transfer data for signal processing via shared memory. A direct memory access (DMA) controller is often associated with a processor in order to take over the burden of transferring blocks of data from one memory or peripheral resource to another and to thereby improve the performance of the processor.

An operating system (OS) is generally provided to manage the digital system by controlling resources and scheduling execution of various program modules or tasks. In a system with several processors, it may be convenient to have a separate OS for each processor. Generally an OS assumes that it is in control of all system resources. Many OSs were not designed in a manner to share memory and resources with another OS. Therefore, when two or more OSs are combined in a single system, resource allocation problems may occur. Conflicts over use of memory or peripheral devices may have dire consequences for system operation.

Most processors are built with 2 levels of privilege: one for the OS, and another one for user tasks. There have been proposals for a third privilege level but this is seldom implemented in current CPUs.

A few operating systems have been certified as secure for specific financial or safety critical applications. Some general-purpose operating systems claim to have security built in, but their fragility is well publicized.

Hardware mechanism can be employed to improve security. For example, U.S. Pat. No. 4,590,552, entitled Security Bit For Designating The Security Status Of Information Stored In A Nonvolatile Memory discloses a mechanism for securing data storage by providing one or more security bits that can be permanently set to inhibit off-chip resources from accessing on-chip memory, thereby protecting code or data stored in the on-chip memory. However, errant operation of the operating system may overcome such security measures.

Thus, improvements in operating system security are needed.

SUMMARY OF THE INVENTION

In general, and in a form of the present invention, a digital system is provided with a secure mode ($3^{rd}$ level of privilege) built in a non-invasive way on a processor system that includes a processor core, instruction and data caches, a write buffer and a memory management unit. A secure execution mode is thus provided on a platform where the only trusted software is the code stored in on-chip ROM. In particular the OS is not trusted, all native applications are not trusted. A secure execution mode is provided that allows virtual addressing when a memory management unit (MMU) is enabled.

The secure mode is entered through a unique entry point. The secure execution mode can be dynamically entered and exited with full hardware assessment of the entry/exit conditions.

A specific set of entry conditions is monitored that account for caches, write buffer and MMU being enabled. The structure of the activation sequence code accounts for caches, write buffer and MMU being enabled. The structure of the exit sequences code accounts for caches, write buffer and MMU being enabled.

BRIEF DESCRIPTION OF THE DRAWINGS

Particular embodiments in accordance with the invention will now be described, by way of example only, and with reference to the accompanying drawings in which like reference signs are used to denote like parts and in which the Figures relate to the digital system of FIG. 1, unless otherwise stated, and in which:

FIG. 5 is a flow chart illustrating access to a secure mode of operation on the system of FIG. 3

FIG. 6 is a state diagram illustrating operation of the security state machine in the system of FIG. 3;

FIG. 7 is a timing diagram illustrating a time based anomaly that can be sensed by the SSM of FIG. 6 to determine a security breach;

FIG. 8 is a timing diagram illustrating another time based anomaly that can be sensed by the SSM FIG. 6 to determine a security breach;

Corresponding numerals and symbols in the different figures and tables refer to corresponding parts unless otherwise indicated.

DETAILED DESCRIPTION OF EMBODIMENTS OF THE INVENTION

Figure 1:
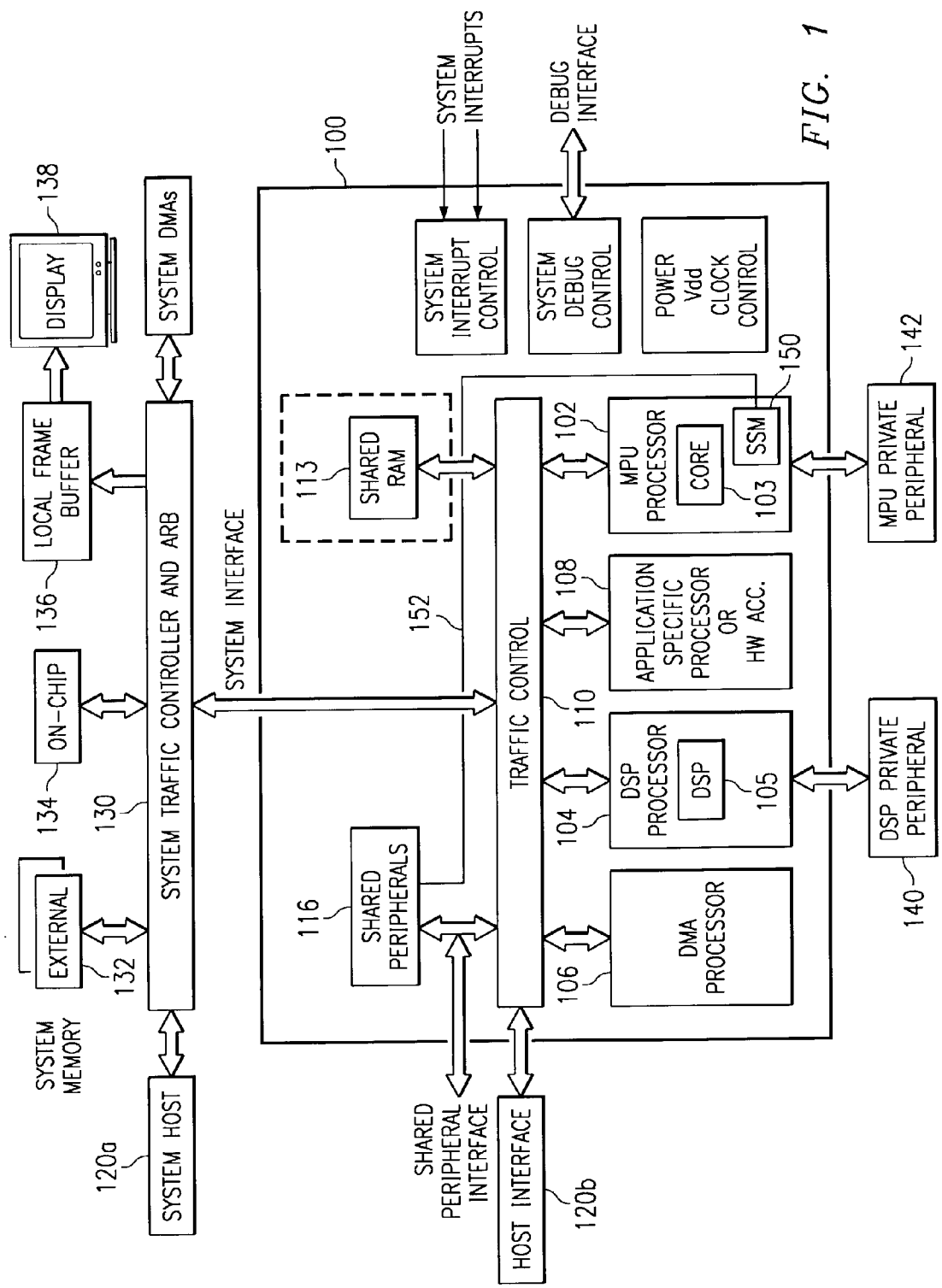
FIG. 1 is a block diagram of a digital system that includes an embodiment of the present invention in a megacell having multiple processor cores.

FIG. 1 is a block diagram of a digital system that includes an embodiment of the present invention in a megacell 100 having multiple processors 102, 104. In the interest of clarity, FIG. 1 only shows those portions of megacell 100 that are relevant to an understanding of an embodiment of the present invention. Details of general construction for digital signal processors (DSPs) are well known, and may be found readily elsewhere. For example, U.S. Pat. No. 5,072,418 issued to Frederick Boutaud, et al, describes a DSP in detail. U.S. Pat. No. 5,329,471 issued to Gary Swoboda, et al, describes in detail how to test and emulate a DSP. Details of portions of megacell 100 relevant to an embodiment of the present invention are explained in sufficient detail herein below, so as to enable one of ordinary skill in the microprocessor art to make and use the invention.

Although the present invention finds particular application to digital systems implemented, for example, in an Application Specific Integrated Circuit (ASIC), it also finds application to other forms of systems. An ASIC may contain one or more megacells which each include custom designed functional circuits combined with pre-designed functional circuits provided by a design library.

A distributed security system using a combination of selected hardware blocks together with a protected software execution environment is provided in megacell 100, according to aspects of the present invention. The distributed security system is a solution to address electronic commerce (e-commerce) and mobile commerce (m-Commerce) security issues within a mobile phone environment. Security issues include the following:

Confidentiality: Ensure that only communicating parties are able to understand the content of the transferred information;

Integrity: Ensure that information has not been altered during transmission;

Authentication: Ensure that other communicating party is who he claims to be;

Non-repudiation: Ensure that the sender cannot deny sending the message;

Consumer Protection: Pseudonym and anonymity;

Protection against Clone.

Current operating systems (OS) cannot be considered secure. Some OSes claim to be secure but their complexity makes this difficult to achieve or certify. For electronic commerce and other secure transactions a secure software layer is needed. This must be transparent to existing OSes yet support memory management unit (MMU) and cache use while supporting interrupts for real time and OS support. Aspects of the present invention provide this capability.

It has been determined that in many applications a software only solution is not robust enough and these issues can only be solved through a well combined hardware and software architecture. The secure mode of the present invention was developed in order to bring hardware robustness to the overall security scheme, and is based on the following assumptions:

The operating system (OS) is not trusted;

All native software running on the platform are not trusted;

The only trusted software is the code stored in the secure program ROM/SRAM;

Caches could be enabled for performance reasons;

Interrupts are enabled for real time reasons;

The MMU could be enabled for flexibility.

The above assumptions drive the following consequences. First, the OS memory management is not trusted. Namely, MMU operations and OS defined translation tables are not reliable. The secure mode should be resistant to any wrong usage of the MMU and to the fact that OS defined translation tables could be corrupted. Secondly, the OS defined interrupt vector table and interrupt service routines are not trusted. There is a need to implement a specific management of the interrupt in secure mode so that the secure mode is resistant to any wrong usage of the interrupt and to the fact that the interrupt vector table and ISR could be corrupted. Thirdly, integrity of OS basic operations like context saving, caches flush, TLB flush, Write buffer draining, etc are not ensured and the secure mode should not rely on them. Last but not least, all test, debug and emulation capability needs to be disabled in secure mode.

In this embodiment, a partitioned "Secure Mode" is created for processor 102 so that it can operate as a separate "virtual security processor" while it is executing security operations. The secure mode can be viewed as a third privilege level for processor 102. Its activation relies on the presence of special purpose hardware creating an environment for protecting sensitive information from access by non-trusted software. The secure mode is set with the assertion of a dedicated security signal 152 that propagates across the system and creates a boundary between resources that trusted software may access and those available to any software.

The secure mode activation relies also on proper control by the security software. Security software is stored in secure program ROM/SRAM and executed from there. There can exist no possible flows by which non-trusted code can either fool the hardware into entering secure Mode, or get trusted code to perform tasks it shouldn't. If the boundary is properly created, there should be no way to utilize the normal operation of the processor to move information from inside the boundary to outside, except through controlled operations. Note that normal operation of the processor includes executing flawed "user-code."

The secure software layer is trusted and stored in secured memory. It is entered through a software sequence that demonstrates to a hardware security state machine (SSM) 150 that it is indeed executing secure code by passing through a single, secured gateway to secure mode while protecting against MMU modification. While the secure software is executing in secure mode, interrupts vectors are redirected so that the security control software can initiate a proper exit from the secure mode if required. The redirection process is done transparently to the OS and prevents any secure data from being visible after the transition.

Referring again to FIG. 1, megacell 100 includes a microprocessor (MPU) 102 with a 32-bit core 103 and a digital signal processor (DSP) 104 with a DSP core 105 that share a block of memory 113 that is referred to as a level two (L2) memory subsystem. A traffic control block 110 receives transfer requests from a host processor connected to host interface 120*b*, requests from control processor 102, and transfer requests from a memory access node in DSP 104. The traffic control block interleaves these requests and presents them to the shared memory and cache. Shared peripherals 116 are also accessed via the traffic control block. A direct memory access controller 106 can transfer data between an external source such as off-chip memory 132 or on-chip memory 134 and the shared memory. Various application specific processors or hardware accelerators 108 can also be included within the megacell as required for various applications and interact with the DSP and MPU via the traffic control block.

External to the megacell, a level three (L3) control block 130 is connected to receive memory requests from internal traffic control block 110 in response to explicit requests from the DSP or MPU. Off chip external memory 132 and/or on-chip memory 134 is connected to system traffic controller 130; these are referred to as L3 memory subsystems. A frame buffer 136 and a display device 138 are connected to the system traffic controller to receive data for displaying graphical images. A host processor 120a interacts with the external resources through system traffic controller 130. A host interface connected to traffic controller 130 allows access by host 120a to external memories and other devices connected to traffic controller 130. Thus, a host processor can be connected at level three or at level two in various embodiments. A set of private peripherals 140 are connected to the DSP, while another set of private peripherals 142 are connected to the MPU.

Figure 2:
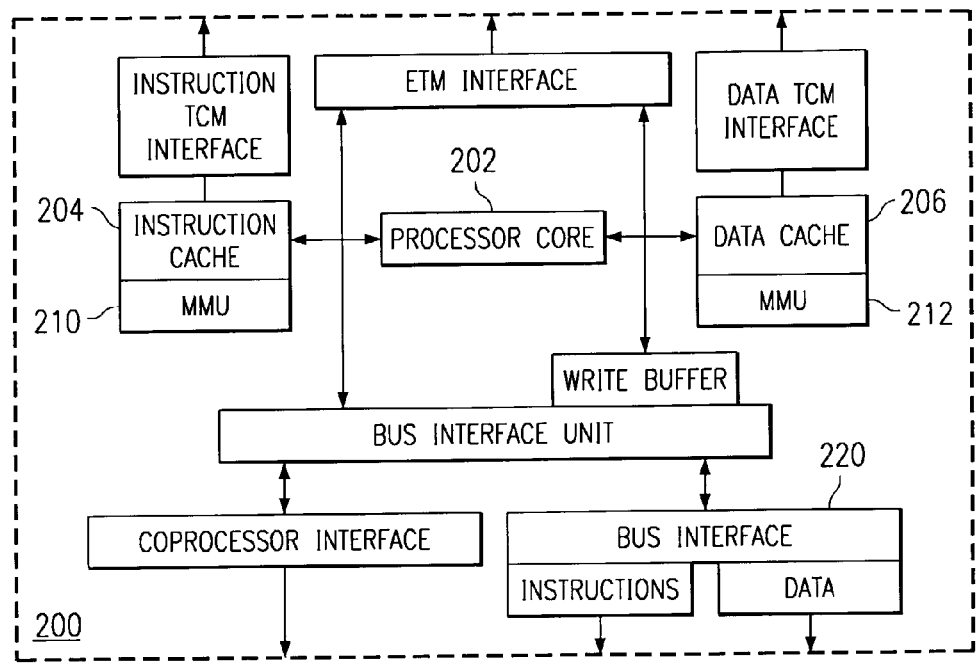
FIG. 2 is a block diagram of a prior art processor used within the MPU block of FIG. 1.

FIG. 2 is a block diagram of a common prior art processor 200 used within MPU block 102 of FIG. 1. An aspect of the invention provides a mechanism to extend an existing processor with or without memory management unit(s) to support secure software services without impacting an existing OS.

In this embodiment, processor 200 is an ARM926EJ-S Macrocell that is a fully synthesizable 32-bit RISC processor comprising an ARM9EJ-S™ Java enhanced processor core 200, instruction and data caches 204, 206, tightly coupled memory (TCM) interfaces, memory management unit (MMU) 210, 212, and an Advanced High-performance Bus (AHB) bus interface 220. The size of the instruction and data cache, and instruction and data TCMs can be independently selected for specific application needs. MMU 210, 212 each include a translation look-aside buffer (TLB). Details of general construction of ARM processors are well known, and may be found readily elsewhere, such as in the "ARM Architecture Reference Manual" Second Edition, edited by David Seal: Addison-Wesley: ISBN 0-201-73719-1.

Advantageously, a secure layer can be added around processor 200 without requiring modification or access to any signals interior to processor 200, as will now be described in more detail.

Figure 3:
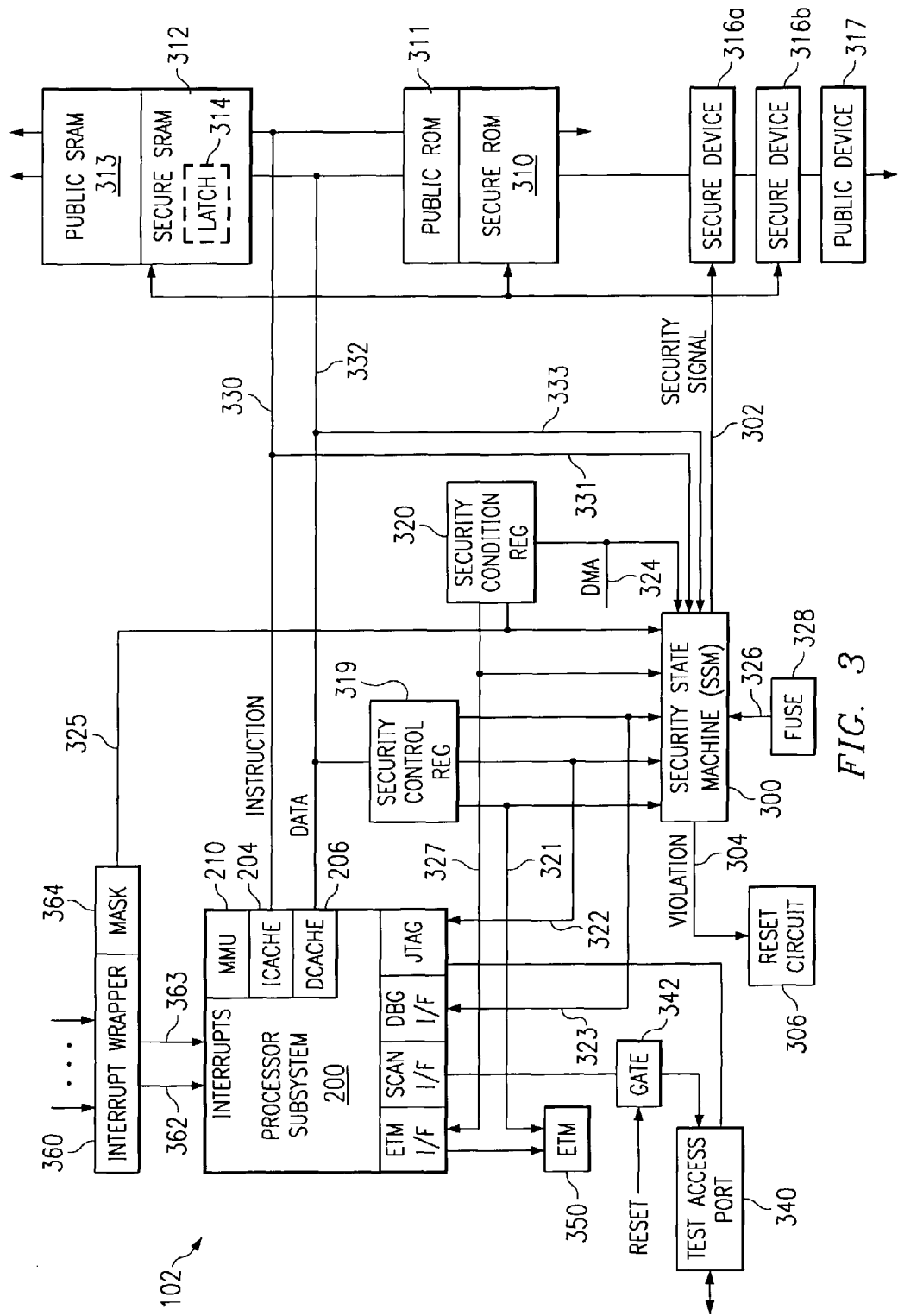
FIG. 3 is a block diagram of the MPU block in the system of FIG. 1 illustrating distributed security using a combination of selected hardware blocks together with a protected software execution environment enforced by a security state machine (SSM), according to aspects of the present invention.

FIG. 3 is a block diagram of MPU 102 in the system of FIG. 1 illustrating distributed security using a combination of selected hardware blocks together with a protected software execution environment enforced by a security state machine 300, according to aspects of the present invention.

The secure mode is a "third level of privilege" for processor 200. The secure mode provides hardware means to restrict access to secure resources of processor 200 provided the appropriate execution environment is set. Secure mode is built around processor 200 that includes a processor core 202, data and instruction caches 204, 206, and an MMU 210, as illustrated in FIG. 2. Advantageously, the security features of the present invention are non-invasive to processor 200, such that another processor can be used in place of the present processor in another embodiment.

The security hardware is of two kinds: the logic that controls the security signal, and the hardware resources restricted to secure mode. The former is mainly composed of security state machine (SSM) 300. SSM 300 is in charge of monitoring the conditions for entering into secure mode, asserting/de-asserting security signal 302 and detecting secure mode violations. A violation is indicated by asserting violation signal 304 that is connected to reset circuitry 306 to cause a system reset when a security violation is detected. The security state machine monitors various signals 330 from processor 200's external interfaces and in particular, the addresses fetched by the processor on the instruction bus. The security state machine is tightly coupled to low-level assembly code from the entry sequence. It reacts to events generated by the entry sequence on the monitored signals.

The secure mode is entered when security signal 302 is asserted. When the security signal is asserted, it propagates throughout the system to unlock access to the secure resources. Only processor 200 can access the secure resources in secure mode. DSP 104 and DMA 106 are not granted access to secure resources by design constraints in this embodiment. The secure resources in this embodiment include: secure ROM 310 (part of the total ROM), secure SRAM 312, and various secure peripheral devices 316a,b. Security signal 302 is asserted by security state machine (SSM) 300 under certain conditions. In secure mode, processor 200 can only execute code that is stored in secure ROM 310 or secure SRAM 312. Any attempt to run code stored outside of these trusted locations will generate a "security violation" by asserting signal 304 that will cause reset circuitry 306 to perform a global reset of the system.

This ROM is partitioned in two parts: a secure portion of the ROM that is protected by the secure bit and can only be accessed in secure mode; and a public portion of the ROM that is always accessible and contains the boot area. Public ROM 311 also contains various security procedures and participates in the overall security scheme.

Secure storage RAM 312 is where secure working data are stored (secure stack, secure global data, secure heap). Secure storage RAM 312 (optional) is dedicated to the execution of non-resident secure code. Non-resident secure code is first downloaded in the secure program RAM from an external memory (FLASH) device and then it is authenticated prior to being executed.

A few byte addresses in the secure storage SRAM 312 are implemented with registers 314 that are reset by the global reset signal. These registers shadow a few normal SRAM locations and can be used as generic SRAM addresses. The only difference is that these registers/SRAM locations will be reset to a value of all 1's. It is useful in secure mode to have few variables that can be reset and therefore have a known initial value and that can only be changed in secure mode. For example, this feature can be used to: detect first entry in secure mode; set a proper exit_ mode value (normal, exception, violation); detect power up; etc. In another embodiment, these resetable values can be implemented in other ways, such as by placing the registers in address space that does not overlay the SRAM, by connecting the reset signal to selected memory cells within the SRAM, etc.

There is no software way to cause security signal 302 to be asserted or to modify the behavior of the state machine. The SSM is tightly coupled to an activation sequence that will be described in more detail with respect to FIG. 6. The SSM monitors processor 200 physical instruction address bus 330 from processor 200 and various entry condition signals 321-327 received from various resources. Instruction interface signals 331 and data interface signals 333 from processor 200 are also monitored and define what type of bus transactions are being performed on instruction bus 330 and data bus 332, respectively.

The secure mode is entered by branching to a specific address in public ROM referred to as the single entry point, which is a hard coded address in the SSM. The entry point is the starting address of an "activation sequence". The activation sequence is a piece of code stored in public ROM that is coupled to the security state machine and ensures that some of the entry conditions for secure mode are met. Other entry conditions are directly assessed by monitoring the specific entry condition signals.

The activation sequence generates a defined sequence of events on some of the signals that are monitored by the security state machine. These events ensure the conditions required to enter in secure mode are met. The security state machine recognizes this pattern and asserts the security signal. In secure mode the security state machine keeps on monitoring a few signals to detect secure mode violation and ensure compliance with secure mode exit procedure. Whenever a violation occurs, the SSM releases the security signal and asserts a security violation signal 304. A typical violation is trying to fetch instructions outside of the ROM/SRAM address range.

The activation sequence is stored in the public ROM. It ensures secure mode entry conditions are met. An environment setting sequence is stored in secure ROM. It sets a proper execution environment for the secure mode where caches, interruption and MMU can be enabled. An exit sequences is stored in secure ROM. It enforces compliance with secure mode exit procedure. It provides a safe way to exit the secure mode by a BRANCH or under an interrupt. It also protects "secret" contents of the secure ROM and RAM on exit.

Referring still to FIG. 3, security control register 319 is accessible as a memory mapped register in secure mode only and is used to enable/disable the test, debug and emulation facilities that could be used by a hacker to breach security but are necessary to qualify and debug system hardware and software. For example, one bit represented by signal 321 enables/disables operation of embedded trace macro-cell (ETM) 350 used for program development. Signal 322 enable/disables operation of the JTAG interface on processor 200. Signal 323 enable/disables operation of a debug interface (dbg I/F) on processor 200.

Security condition register 320 is accessible as a memory mapped register in non-secure mode and is used to set some of the entry conditions in secure mode by controlling the operating mode of various resources that could be used by a hacker to breach security. Signals issued from the security condition register 320 are also monitored by the security state machine 300. For example, direct memory access (DMA) enable signal 324 is used to enable a DMA controller (not shown) that can access secure memory 312.

In this embodiment, a scan chain interface (Scan I/F) is provided for testing and could provide a security breach point. However, processor 200 provides no means to disable the scan chain output. In order to avoid modifying internal signals of processor 200, a scan gate 342 is provided externally that is used to mask the scan output of processor 200 for a number of clock cycle equal to the longest scan chain within processor 200. This masking scheme is initialized (counter reset) at reset and each time the device is switched from functional to test mode with scan enabled under control of external test equipment (not shown).

An external interrupt handler 360 is provided to receive a set of interrupt signals and multiplex these into two interrupt signals 362, 363 that are then received by processor 200. Interrupt handler 360 has a global mask bit 364 that can be set by software and allows software to globally disable all the interrupts to the processor. The interrupt controller asserts a mask signal 325 whenever the global mask bit is set and interrupt signals 362, 363 are inactive. After mask signal 325 is asserted, interrupt signals 362, 363 output by the interrupt controller cannot be asserted anymore until after the global mask bit is cleared by software. SSM 300 monitors mask signal 325 to determine if interrupts are enabled or masked.

Booting from an external memory is a common means for a hacker to thwart security in a system. In this embodiment, external booting is prevented. In addition, SSM 300 monitors boot signal 327 that is asserted when an external boot is attempted. However, during program development it may be beneficial to allow external booting in order to better debug software. Fuse circuit 328 is provided to distinguish a development device from a production device. Device-type signal 326 is monitored by SSM 300 so that a relaxed security mode can be provided on development devices. For development devices, SSM 300 ignores boot signal 327.

Figure 4:
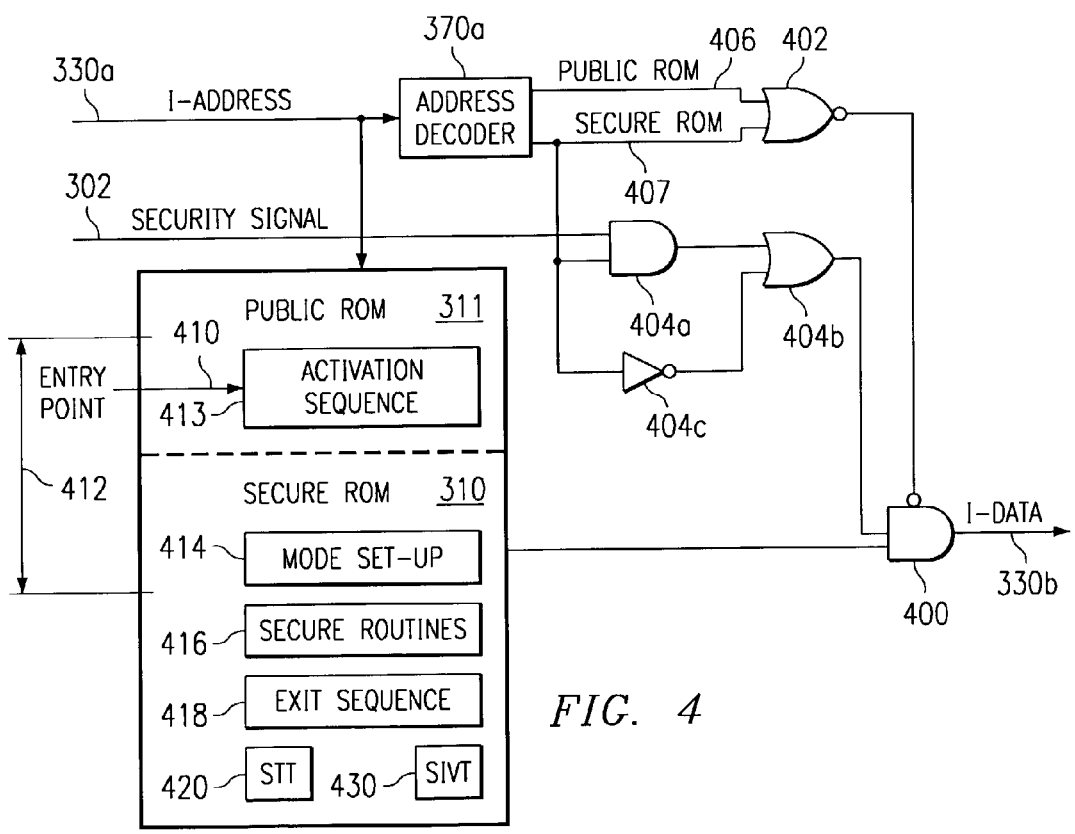
FIG. 4 is a block diagram illustrating contents of the ROM of FIG. 3 and circuitry for segregating the ROM into a public portion and a secure portion.

FIG. 4 is a block diagram illustrating contents of the ROM of FIG. 3 and circuitry for segregating the ROM into a public portion and a secure portion. Public ROM 311 and secure ROM 310 are implemented as a single ROM in this embodiment. In another embodiment, they may be separated without affecting the inventive aspects herein. Address decoder circuit 370a is a portion of decode circuit 370 that decodes accesses to the ROM. Similar circuitry is provided for the SRAM and other instruction or data bus connected devices.

Driver circuit 400 is enabled to provide requested instruction data on instruction bus 330b whenever an address corresponding to ROM 310, 311 is asserted on instruction address bus 330a in response to an address decode signal 406 or 407 corresponding to a public ROM address or a secure ROM address, respectively.

As mentioned above, if a secure resource is accessed when not in secure mode, dummy data is provided. Gate circuit 404 monitors security signal 302 and secure ROM decode signal 407 and causes driver circuit 400 to pass null data if the secure ROM is being accessed and the security signal is not asserted.

Secure Mode

A more detailed description of the operation of the secure mode will now be provided for the system of FIG. 3. As mentioned earlier, in this embodiment processor 200 is an ARM RISC processor, and in particular an ARM926 version; however, inventive aspects of a security mode described herein can be used effectively with other types of processors.

FIG. 5 is a flow chart illustrating access to a secure mode of operation on the system of FIG. 3. Steps 500, 502, 504 represent an application program being executed on processor 200 in a normal, non-privileged level of execution. On occasion, a call 502 is made to an operating system (OS) for service in a privileged level of operation, as represented in steps 510-516. Upon being called, the OS saves state and switches to privilege mode in step 510, performs the privileged operation in step 514, restores state in step 516 and returns to the non-privileged application at step 504. These two levels of operation are well known.

In step 512, a test is made to determine if the requested service is for a secure operation; if so, the system will enter a third level of security called secure mode. In step 520, the OS driver performs house-keeping tasks to place the system in an appropriate state for entry into a secure mode. This includes masking interrupts, setting security condition register 320 to disable the various resources that pose a security risk, and verifying that if memory management unit 210 is enabled, that a page table entry corresponding to the activation sequence is marked as "non-cacheable." This will be described in more detail later.

In step 522 and referring again to FIG. 4, a jump is made to an entry point 410 in an entry sequence 412 located in public ROM 311. The entry sequence in is a piece of code that is executed each time a "secure service" is invoked by an application prior to running any type of security code on the platform. This sequence is also executed when returning from an exception that has interrupted security code execution. The entry sequence starts at a defined address in ROM, which is hard-coded and called the "entry point." The entry sequence is composed of two parts: a security signal activation sequence 413 and secure mode environment setting sequence 414.

The purpose of the activation sequence is to take over the execution flow of the processor 200 and ensures that it cannot be preempted by any other non-trusted code. At some point during this part of the entry sequence, security signal 302 is asserted to enter secure mode and unlock access to secure resources (ROM, SRAM, devices . . . ).

The intent of environment sequence 414 is to set the environment for secure code execution. Advantageously, by setting up a secure environment it is possible to safely enable program and data caches and to handle interrupt exceptions.

Security signal activation sequence 413 is located in the public ROM while secure mode environment setting sequence 414 is located in secure ROM. The total code size of the entry sequence (part 1+part 2) is required to be smaller then 1 Kbyte so that it can be mapped in a 1 KB page, the smallest memory section in MMU translation tables for this embodiment. This way, the entry sequence virtual addresses cannot be mapped over two sections in order to preempt the processor at some judicious point during the execution of the entry sequence. It is also important that the memory page of the entry sequence is non-cacheable or the instruction cache is disabled while running the entry sequence.

Secure translation table (STT) 420 and secure interrupt vector table (SIVT) 430 will be described later.

If the 1 Kbyte code size is seen as too restrictive for a given embodiment, the MMU can be disabled at the end of activation sequence 413 and re-enabled at the end of environmental sequence 414. In this case the 1 KB limitation will only apply to the activation sequence.

Referring again to FIG. 5, the activation sequence is checked for correctness by SSM 300 in step 524, as will be described in more detail with respect to FIG. 6. If the activation sequence is not performed correctly, then SSM 300 asserts the violation signal in step 540 and the system is reset. The secure environment is set-up in step 526 by executing environment setting sequence 414, as will be described in more detail later.

Once a secure environment is established, then the requested secure operation is executed in step 528 from secure code 416 as requested initially by the non-privileged application.

After completion of the secure operations, the normal way to exit the secure mode in step 530 is to jump to a "normal exit sequence" in secure ROM exit sequence 418. The intent of the normal exit sequence is to comply with a secure mode exit procedure and to ensure protection of "secret" contents on exit. The normal exit sequence can be located anywhere in secure ROM; there is no hard-coded address check in the security state machine.

While in secure mode, SSM 300 continues to monitor signals 321-327 and 331. Based on these signals, the SSM can detect security violations. Whenever a violation of the secure mode occurs, the SSM detects it, releases the security signal and generates a security violation, as indicated at arc 542. The violation initiates a global reset of the device. A security violation drives the SSM into a blocking state that can only be exited by a reset. The following violations can be detected: violation 1—An instruction is fetched at an address outside the full ROM and RAM address range; violation 2—processor 200 is reset; violation 3—test, emulation, or debug features are enabled.

When an exception occurs, processor 200 jumps to the corresponding exception vector in an interrupt vector table (IVT) from where it is re-directed to the specific interrupt routine. The IVT is generally managed by the OS and it is not located in secure SRAM. Therefore, its content are not protected and cannot be trusted. Moreover, from the security point of view, it would not be acceptable to allow the processor to jump directly to the exception vector for two reasons: (1) it is incompatible with the overall security scheme; a "jump" outside the secure memory address range is considered as a security violation; (2) the caches and processor registers are full of "secret" contents and need to be cleared before releasing the secure bit and executing non-secure code. In order to allow interrupts while in secure mode, a secure IVT is provided, as will be described in more detail with respect to FIG. 10.

A variable "exit_mode" holds the status of the last exit from secure mode: normal, exception, or violation. It is important that the environment sequence reads this variable and checks this status during step 526. This variable is implemented using register 314 located in the secure SRAM address space. The following conditions may be encountered:

a) The "exit mode" reads all 1: this is most likely the first time secure mode is entered after power up; "exit_mode" is set to "violation"

b) The "exit mode" reads "normal": the last exit from secure mode was a normal exit sequence; the secure code can proceed c) The "exit mode" reads "exception": the last exit from secure mode was an exception exit sequence; a return from interrupt needs to be performed d) The "exit mode" reads "violation": the last exit from secure mode was a violation; appropriate action needs to be taken.

FIG. 6 is a state diagram illustrating operation of security state machine 300 in more detail. The security state machine asserts the security signal at some point during the execution of the activation sequence in ROM in order to enter secure mode. The purpose of this part of the entry sequence is to generate a defined sequence of events on the signals that are probed by the security state machine. These events ensure the conditions required to set the security signal are met and they are tracked by the SSM. All the conditions to enter in secure mode and the associated signals probed by the state machine are listed in Table 1. The "condition" signals are monitored throughout the activation sequence. If any of the entry conditions are not met or cease to be valid before the end of the activation sequence, the security state machine will transition to violation state 630 and assert security violation signal 304.

There are two key objectives behind the entry conditions listed in Table 1: (1) processor 200 is fetching and above all executing the activation sequence code, (2) trusted code has fully taken over the CPU execution flow and nothing could preempt it before or after the security signal is set except through controlled operations.

TABLE 1

Entry conditions for activation sequence

| | Description of condition | signals |
|---|---|---|
| 1 | Read access in ROM in the activation sequence address range are privileged mode access and opcode fetch only and not data access. This condition ensures the secure mode could not be entered directly by a user application or set by reading the entry sequence as data. | I-I/F 331 |
| 2 | The opcode fetched in secure ROM at the activation sequence address range are non-cacheable. ☐ When a non-cacheable (physical) addresses is seen on instruction address bus 330, the corresponding instruction will necessarily enter the processor pipeline. This condition ensures the SSM is not fooled by cache pre-fetch effect. | I-I/F 331 |
| 3 | Interrupts disabled. This condition contributes to ensure the activation sequence code is indeed being executed. It also contributes to prevent non-secure code from preempting the execution flow before secure environment is properly set. | Mask 325 |
| 4 | CPU aborts are not allowed to occur through the activation sequence. ☐ An instruction that has entered the instruction pipeline could not be tagged "abort" and prevented from reaching the execution stage. | EYM 327 |
| 5 | Data activity (including pending request) is not allowed through the activation sequence; therefore no delayed event could be generated during the activation sequence using the write buffer. This way no code executed prior to entering the activation sequence could still have an effect during of after it. It contributes to ensure that the secure mode fully owns the processor operations. | D_I/F 333 |
| 6 | All instruction pipeline stages are "cleaned" from operation related to non-trusted code; therefore no (non trusted) code fetched prior the activation sequence could have a delayed effect after the security signal is asserted because of the instruction pipeline latency. No signals are required here. This condition is ensured by "construction" of the activation sequence. | |
| 7 | Integrity of the activation sequence address pattern. The complete activation sequence is fetched with the right order and associated moment in time. | I-addr, ready |
| 8 | Processor 200 is not in Thumb or Java mode. The secure mode could only be entered in ARM execution mode since the activation sequence instructions are ARM mode instruction. | EMT I/F |
| 9 | TCM Interface is disabled so that non-trusted code executed from TCM could be inserted or mixed with the activation sequence. This condition contributes to prevent non-secure code from preempting the execution flow before secure environment is properly set. | TCM I/F |
| 10 | The processor is not in test, scan, debug or emulation/trace. The secure mode can only be entered in normal operation mode. In other modes, sensitive information could be scanned out. This condition contributes to ensure that the secure mode fully and truly owns the processor operations. | JTAG 322, Dbg 323, ETM 321 |
| 11 | The processor booted from ROM | Boot 327 |

The activation sequence is constructed in such a way that it generates a unique on the instruction address bus. The pattern is made of the (physical) address value of the activation sequence code and the relative moment in time, these addresses should appear on the bus. Nevertheless, the pattern is made independent of the memory system access latency. The exact activation sequence bus pattern is obtained from simulation and hard-coded in the SSM. The SSM thus ensures full compliance with the activation sequence bus pattern.

TABLE 2

Entry Sequence Addresses, activation sequence operations

| Physical Address | Operation | Note/Reference |
|---|---|---|
| ESA[0] | NOP | {1} Entry sequence page base address in non-secure ROM |
| * | NOP | |
| * | NOP | |
| * | NOP | |
| * | NOP | |
| * | NOP | |
| ESA[EP] | NOP | {2} ENTRY POINT (EP). Entry conditions must be met. Starting address of the activation sequence. |
| * | NOP | End of cache line |
| * | NOP | {3} Beginning of cache line. |
| * | NOP | |
| * | NOP | |
| * | NOP | |
| * | NOP | |
| * | NOP | |
| * | FLUSH Instruction cache Or Disable Instruction cache | {4} |
| * | NOP | End of cache line |
| * | NOP | Beginning of cache line |
| * | NOP | |
| * | NOP | |
| * | NOP | |
| * | NOP | |
| ESA[EAS] | NOP Or Disable MMU | {5} Security signal is asserted. End of activation sequence (EAS) |
| * | NOP | {6} |
| * | BRANCH ESA[SR] | End of cache line. Branch to the environment setting sequence |
| ESA[SR] | | {7} Secure ROM (SR) start address. Starting address of the environment setting sequence |

Table 2 illustrates an activation sequence for processor 200 and enumerates the entry sequence addresses (ESA). Processor 200 has a five-stage instruction pipeline. In other embodiments using processors with a different length instruction pipeline, the number of NOPs in the activation sequence may need to be changed accordingly. Instruction cache 204 within processor 200 has a line length of eight 32-bit words. Other embodiments may have a different length cache line and may therefore need an appropriately modified activation sequence. Various aspects of the activation sequence will now be discussed.

Referring to notation {1}, ESA[0] is the base (32-bit) address (physical) of the page in non-secure ROM that contains the entry sequence. Six NOPs are inserted between the beginning of the page and the entry point (EP). The exact number of NOPS is not critical, but the important thing is that ESA[0] and ESA[EP] would be located in the same cache line (8 words) and the entry point is not located at the very beginning of the memory page. In this manner, the entry point cannot be approached with linear code in virtual memory via a contiguous memory page, but only by a jump to the entry point address. Likewise, the entry point cannot be approached by code in the cache in case the first cache line of the page is a hit, which could result from a misuse of the cache/MMU flush. This structure of the activation sequence also ensures that an instruction pre-fetch buffer in processor 200 is empty when ESA[EP] is fetched and will not build up pre-fetch advance. In this manner, the pipeline depth is not artificially modified by the pre-fetch buffer. Thus, the last non-trusted instruction executed prior to the entry address is either a JUMP to entry address or known instruction, such as the sequence of NOPs.

Referring now to notation {2}, ESA[EP] is the entry point and it is the start of the activation sequence. ESA[EP] to ESA[EAS] are hard-coded addresses in the security state machine that permanently monitors address bus 330. Once the SSM detects ESA[EP], the SSM must see a sequence of addresses corresponding to ESA[EP] to ESA[EAS] with the expected bus pattern. If the activation sequence bus pattern does not comply with the one expected by the SSM or if any of the entry conditions are not met or cease to be valid before the end of the sequence, the security state machine will generate a security violation.

Referring now to notation {3}, when the physical addresses of this cache line are seen on the bus with all the entry conditions valid, it insures the instruction NOPs after the entry point are indeed fetched and executed. These NOPs are required to clean the instruction pipeline of processor 200 to meet condition 6. Since processor 200 has a five stage pipeline, five NOPs is the minimum necessary to make sure the pipeline is cleaned. Thus, the flush instruction is positioned in the activation sequences so that its address corresponds to position p in a line of the I-cache, where the distance between p and the last instruction of a line in the I-cache matches the rank of the execution stage in the CPU pipeline.

Referring now to notation {4}, an instruction cache flush instruction or an instruction cache disable is performed. Flushing the I-cache improves the robustness of the entry sequence. One NOP after the flush is important so that Flush would not be the last instruction of the cache line and would be in the pipeline execution stage when the first word of the next line will be fetched.

Referring now to notation {5}, address ESA[EAS] is the end of the activation sequence; this is where secure mode is entered and the SSM asserts the security signal. Five NOPs are performed prior to ESA[EAS] to clean the pipeline again. The last instruction of the activation sequence at ESA[EAS] can be used to disable the MMU. If the MMU is disabled, the 1 kB memory size constrain on the entry sequence is relaxed; however, the activation sequence and part of the environment setting sequence must then be flat mapped.

Referring now to notation {6}, one NOP is inserted to allow the propagation of the security signal. The BRANCH instruction jumps to the environment setting sequence, which is located in secure ROM. The NOP and BRANCH instructions are still located in a region of the ROM which is not protected by the security signal. The NOP and the BRANCH latency ensure that the security signal is set at the boundary of the ROM before trying to fetch code in its protected part.

Referring now to notation {7}, ESA[SR] is the starting address of the secure ROM which is protected by the security signal. ESA[SR] is reached through a branch and not with linear fetching at the end of the activation sequence. This is to allow more flexibility in the location of the boundary between the non-secure and secure ROM for ease of decoding of the boundary.

After secure mode is entered and the security signal has been asserted, the entry conditions are not required to be valid and the SSM does not continue to test them. However, the SSM keeps on probing various signals in order to detect secure mode violation, as will be described later. The secure mode exit conditions are not tested until after the secure memory is effectively entered and ESA[SR] is detected.

Referring again to FIG. 6 state 600 is an idle state during which the SSM monitors address bus 330 looking for ESA [EP]. Once the entry point address is detected, the SSM transitions to state 601 if all of the entry conditions are met, if not, it transitions to violation state 630 where violation signal 304 is asserted.

Each of states 601-615 must be sequentially traversed by detecting the correct entry sequence address and corresponding entry condition signals or else the SSM transitions to violation state 630. If the sequence is correctly traversed, then secure mode state 620 is entered and security signal 302 is asserted.

For example, in order to transition from state 600 to state 601, the address of the entry point instruction must appear along with all of the correct condition signals listed in Table 1. The next address that appears must be the address of the next sequential instruction in order to transition to state 602, otherwise the SSM transitions to violation state 630. In a similar manner, each address of the activation sequence must appear to transition to states 602-615 and finally to secure mode state 620. An incorrect address, address timing, or an incorrect change in a condition signal will result in a transition to violation state 630, such as indicated at arc 601a. Similarly, the activation sequence is aborted if the status signals indicate that any one of the activation sequence accesses is cacheable.

While in secure mode state 620 and after ESA[SR] was effectively detected (indicating that the secure memory was entered), if an address is detected by the SSM that lies inside the public ROM, then the SSM transitions back to idle mode 600, as indicated by arc 621. If an address is detected by the SSM that lies outside of the ROM or SRAM, or if a security violation is indicated by an incorrect change in a monitored signal, then the SSM transition to violation state 630 as indicated by arc 622.

The instruction cache is not required to be disabled during the activation sequence; non-cacheability of the instruction is enough to ensure robustness of the entry sequence. Nevertheless, having the cache disabled would eliminate hacking attempts that are based on ill-use of the cache flush mechanisms.

Table 3 lists all of the signals monitored by SSM 300 in this embodiment as an example of the types of signals that are useful for establishing and maintaining a secure environment. Other embodiments will monitor signals that are appropriate for the type of processor used in each such embodiment.

TABLE 3

SSM interface

| Signal name | I/O | Description |
| --- | --- | --- |
| IHADDR[31:0] | I | Instruction address bus |
| IHPROT[3:0] | I | Instruction access information |
| IHTRANS[1:0] | I | Instruction transfer type |
| IHREADY | I | Instruction transfer completed |
| SECURITY_INTERRUPT_MASK | I | Interrupt disable status |
| ETMIABORT | I | Instruction abort |
| ETMDABORT | I | Data abort |
| DHTRANS[1:0] | I | Data transfer type |
| DHBUSREQ | I | Data bus request |
| ETMIJBIT | I | Java mode |
| ETMITBIT | I | Thumb mode |
| DRIDLE | I | Data TCM idle |
| IRIDLE | I | Instruction TCM idle |
| DRCS | I | Data TCM enable |
| IRCS | I | Instruction TCM enable |
| SECURITY_CONTROL_JTAG | I | JTAG enabled/disabled |
| SECURITY_CONTROL_ETM | I | ETM enabled/disabled |
| SECURITY_CONDITION_TRACE | I | Trace enabled/disabled |
| SECURITY_CONTROL_ICE | I | Debug enabled/disabled |

TABLE 3-continued

SSM interface

| Signal name | I/O | Description |
| --- | --- | --- |
| SECURITY_CONDITION_DMA | I | DMA access enabled/disabled |
| SECURITY_CONDITION_OCPI | I | OCPI access enabled/disabled |
| SECURITY_CONDITION_ETM_IF | I | ETM IF enabled/disabled |
| HRESETn | I | ARM926 reset |
| ARM_CLK | I | ARM926 clock |
| SECURITY_DEVICE_TYPE | I | Normal/development device |
| ARM_BOOT_MODE | I | Internal/external boot |
| SECURITY_TEST | I | Device in test mode |
| SECURITY_TEST_AT_SPEED | I | Device in test at speed mode |
| SECURITY_VIOLATION | O | Used generate global reset |
| SECURITY signal | O | Secure mode status signal |

FIG. 7 is a timing diagram illustrating a time-based anomaly that can be sensed by the SSM to determine a security breach. The time dependency built in the activation sequence bus pattern is important to detect hacking attempt based on misuse of MMU/cache flush. In this sense, it ensures the activation sequence is fully in control of the processing flow. It is also a way to improve the resistance to a hacking scenario that makes use of an undefined instruction or software interrupt (SWI). In this embodiment, wait states are ignored so that memory latency is not an issue. In another embodiment, it may be useful to monitor wait states, also.

Clock signal 700 represents a system timing signal in which one instruction is fetched per clock period and executed in the instruction execution pipeline. Instruction address sequence 702 is representative of a portion of an activation sequence such as discussed with respect to Table 2. Typically, instructions are completely executed without pipeline delay. Certain instructions, such as a cache flush instruction 710, could require extra processing and result in a pipeline bubble as indicated at 712a. The SSM is hard coded to expect this bubble at a particular time.

Address sequence 704 illustrates what might be a hack attempt in which bubble 712b does not occur at the expected time. In this case, the SSM detects the ill-timed bubble and transitions to the violation state.

FIG. 8 is a timing diagram illustrating another time-based anomaly that can be sensed by the SSM to determine a security breach. In this example, instruction address sequence 702 is fetched as in the previous example. A ready signal 800 is asserted for each instruction fetch to indicate the instruction is being fetched from physical memory. The SSM monitors the ready signal and expects the ready signal to be asserted for each instruction fetch.

Ready signal 802 illustrates what might be a hack attempt wherein the cache was enabled such that the ready signal is not asserted for each instruction in the activation sequence because some of the instruction are provided by the cache. In this case, the SSM detects the missing ready pulses and transitions to the violation state.

Secure Mode Environment Setting Sequence

Referring again to FIG. 5, in step 526 a secure environment is set-up by executing environment setting sequence 414 from secure ROM. The purpose of this sequence is to set a suitable environment for secure code execution. A secure environment allows enabling program and data caches, real time interrupts and potentially the MMU. This section lists all the steps performed by the environment setting sequence after the secure bit activation. Some of these steps are specific to secure mode operations and some are operations that should have normally been performed by the OS prior to calling the activation sequence. As discussed earlier, the secure mode cannot rely on basic OS operations. Therefore, the environment setting sequence needs to perform some of the context switch operations, such as cache flush, TLB flush, etc that are essential for the secure mode integrity.

The first step to set the secure environment consists in flushing the instruction & data caches (Icache, Dcache). It is essential to the secure mode integrity when the Icache & Dcache are enabled. In secure mode, processor 200 is only allowed to run trusted code, which is stored in secure ROM or secure RAM. If the caches were not flushed, non-trusted code and its related data that would be mapped at the same virtual addresses as the secure code could run from the cache and benefit from the secure bit. This situation could not be detected. The SSM keeps on monitoring the address bus to detect when an opcode is fetched outside the address boundary of the secure ROM or SRAM but it cannot detect if non-trusted code is executed from the cache. In an embodiment in which Icache and Dcache are not used for secure code execution and disabled through-out secure mode, then the caches do not need to be flushed.

Interrupt is one good example of why the cache needs to be flushed. In secure mode, the interrupt vector table is re-mapped if interrupts are enabled, as will be described later. When an interrupt occurs in secure mode the processor must fetch the new interrupt routine from the ROM and not to run the original one that could be stored in cache. The Icache was flushed or only disabled as part of the activation sequence. Several approaches are therefore possible in the environment setting sequence a) Activation sequence flushed the Icache: In this case, the environment setting sequence will simply need to flush the Dcache.

b) Activation sequence disabled the Icache: In this case, the environment setting sequence could simply disable the Dcache also and proceed with both caches disabled in secure mode. The environment setting sequence could also flush both Icache & Dcache and re-enable the Icache In addition to flushing the caches, it is also important unlock the cache. Otherwise, a portion of the cache could still be locked down and be unavailable for line-fills, but contain no valid data.

Processor 200 provides additional test operations that allow modifying expected cache/MMU behavior. These registers are intended for test purposes only but they are operational in normal mode. This makes them a potential security hole that needs to be handled. The environment setting sequence must check that the setting of the debug registers corresponds to their reset values A proper environment for secure code execution requires dedicated stacks in secure SRAM. The environment setting sequence will manage the secure stacks storing the current value of the stacks pointers (R13 registers of processor 200) in secure SRAM at a location referred to as Original_stack_pointer. Stacks pointers R13 are then loaded with secure stacks pointers value from locations in secure SRAM referred to as secure_stack_pointers. No operation in the activation sequence or environment setting sequence can use the stacks until the secure stacks are set in order to prevent a security breach via the stacks. Setting the stacks pointer requires access to the secure SRAM. This can only be done in safe way after the environment setting sequence properly set the TLB as described in "Memory management in secure mode," which will now be described.

Memory Management In Secure Mode

The OS MMU translation tables are not stored in secure SRAM, therefore their contents are not protected and cannot be trusted. Secure memory management ensures that in secure mode, the memory operations (fetch, read, write) are performed at the intended physical address. This leads to different constrains depending on whether the MMU is enabled or disabled.

When the MMU is disabled, the processor uses directly the physical addresses, which is inherently secure. In this case, the secure memory management is reduced to its minimum. In addition, the SSM will enforce the restriction on code executed in secure mode. The SSM keeps on monitoring the full physical address fetched by the processor. Whenever, the processor fetches an instruction outside of the ROM or the secure RAM address range, the state machine detects it and generate a security violation.

When the MMU is enabled, the processor uses virtual addresses. Therefore, this option allows for more flexibility but requires a more sophisticated memory management. The environment setting sequence must ensure that in secure mode there is no way to fetch an instruction at an address that is not located within the secure ROM or the secure RAM address boundary. ☐Virtual to physical address translation integrity is enforced so that an address fetched corresponds to the expected memory location in secure ROM, a data access (read/write) intended for secure SRAM or secure peripherals are indeed performed at the expected location in secure SRAM or secure peripherals, and a data transfer between secure SRAM and non-secure memory is possible but only through controlled operations in order to avoid a Trojan horse type of attack.

In order to allow the MMU to be enabled while in secure mode, the environment setting sequence will make sure that before any secure code is run, the MMU TLBs 210, 212 are locked and loaded with a known and reliable translation for the ROM, secure SRAM, data buffer and relevant I/O addresses. The secure ROM contains a pseudo translation table, referred to as a secure translation table (STT) and illustrated in FIG. 4 as SST 420. This table is not fully populated. It holds only a few entries necessary to describe completely the secure code and secure data. They will be referred to as secure entries. The environment setting sequence will first flush the TLBs and then forces the loading of the secure entries in the lockdown region of the TLB. In the present embodiment, this is achieved by using a CP15 prefetch Icache line instructions for instruction MMU TLB 210 and a simple load instruction for data MMU TLB 212. In another embodiment, a TLB is loaded and locked using an operation appropriate for that embodiment. In case the MMU is first disabled, the secure SRAM can be used to build the SST from entries stored in ROM and then load them in the TLB.

Processor 200 provides for eight entries in each of the data and instruction TLBs to be locked down. This gives enough flexibility to hold the required TLB entries that are listed in Table 4. It should be recognized that the number of entries required in the SST will vary depending on the size of ROM/RAM in the secure area.

TABLE 4

TLB entries for Secure Translation Table

| Number of entries | description |
|---|---|
| 1 | instruction TLB for the ROM |
| 1 | instruction TLB for the interrupt re-mapping |
| 1 | 1 data TLB for the secure SRAM and e-fuse. |
| 1 | 1 data TLB for IO memory space |
| 1 or 2 | 1 or 2 data TLB to describe regions in non-secure memory (SRAM, SDRAM, flash) dedicated to data transfer across the secure boundary defined by the security signal |

Data that are transferred between the secure environment and the non-secure environment can only be of two types: non-secure data and encrypted secure data. An issue to solve when exchanging data and in particular an address pointer is to ensure that data read and write are performed at the correct intended physical address. A corrupted read address could cause instability/unpredictability of the secure code execution, which could jeopardize the security. A corrupted write address could also cause instability/unpredictability of the secure code execution. In addition, if the address falls within the secure SRAM boundary, it could mess up secure data. This is the typical case of Trojan horse that could jeopardize the security.

One solution to avoid these issues is to restrict the address pointer exchange between secure and non-secure code to physical address pointer only. It is then the responsibility of the secure code to assess that these are valid (pre-defined) physical addresses. Advantageously, by locking a few TLB entries as described above, regions and buffers can be described in non-secure memory (flash, SDRAM, on-chip SRAM . . . ) by their virtual addresses that are then fully reliable. Data transfers across the secure environment boundary goes only through these trusted buffers.

Figure 9:
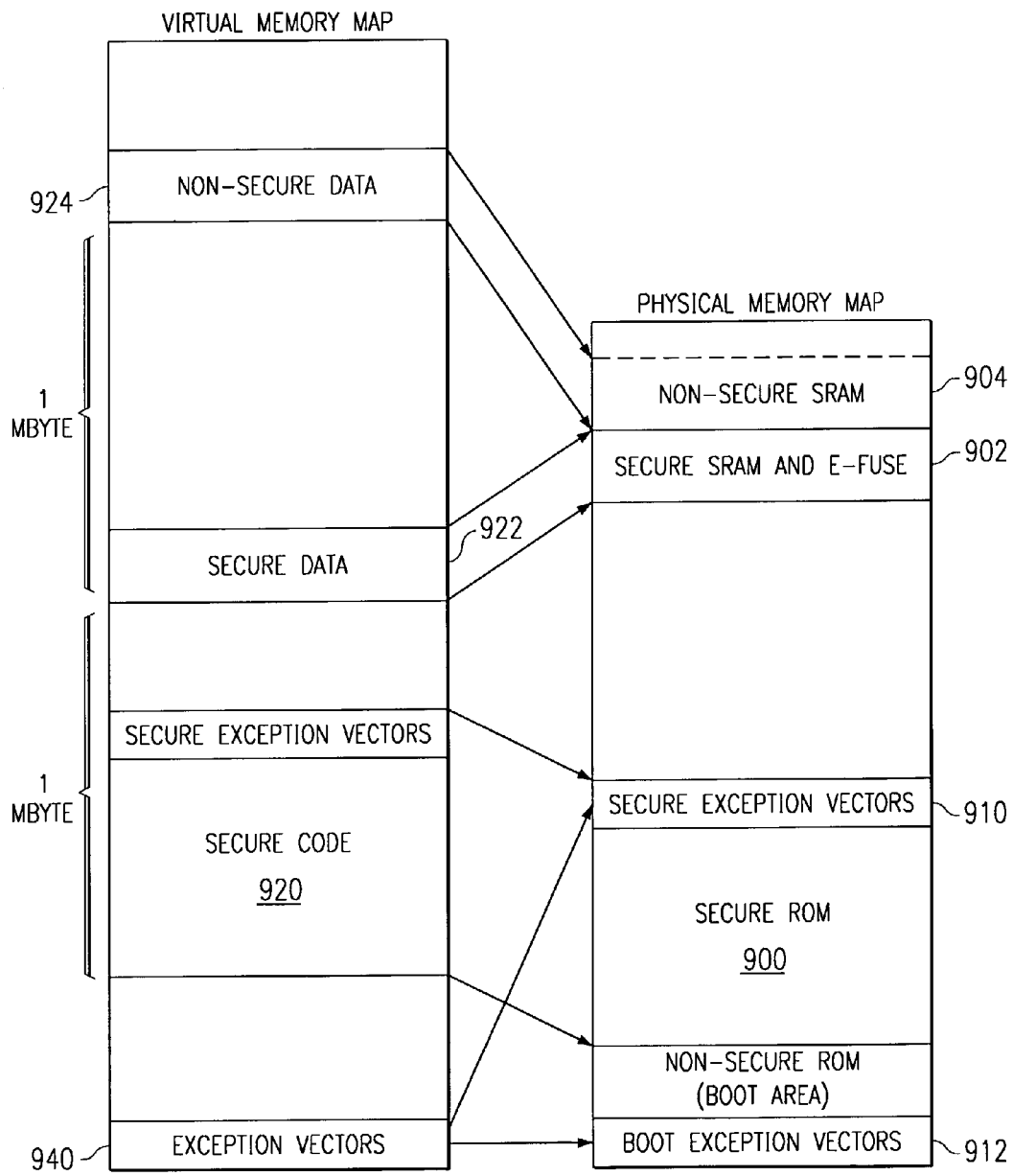
FIG. 9 is an example memory map using a secure translation table.

FIG. 9 is an example memory map using a secure translation table as described in Table 4. Secure code 920 is mapped into secure ROM physical address space 900. Secure data region 922 is mapped into secure SRAM physical address space 902 while non-secure data region 924 is mapped into secure SRAM physical address space 904.

Enabling the Interrupts While In Secure Mode

If an exception occurs during secure code execution, the secure mode must be exited in a way that protects the secure content before executing the interrupt routine. In order to do so the interrupt vector table (IVT) must be re-mapped in the secure ROM while in secure mode. There are six types of exception in processor 200: undefined instruction, software interrupt (SWI), Abort, interrupt (IRQ), fast interrupt (FIQ), and reset. The Reset is handled separately and will be described in more detail later, along with some specificity for abort and SWI.

When an interrupt occurs, the processor is first made to jump to the secure IVT that handles the exit from the secure mode in response to the interrupt before branching to the original (OS) interrupt vector. There are two options to re-map the interrupts depending on the MMU being active or not in secure mode: (1) if the MMU is active, the environment setting sequence can use it to re-map the IVT by locking a TLB with the proper page translation for exception vectors virtual addresses, as illustrated by secure exception vector region 910 of FIG. 9; (2) if the MMU is not active, then this re-mapping is be done automatically by hardware in the secure ROM wrapper upon assertion of the security signals.

The MMU being active or not in secure mode and the corresponding method to re-map the interrupts is not a last-minute choice. The decision needs to be made before the implementation so that appropriate address mapping circuitry that is responsive to the security signal can be included in the ROM wrapper, if needed. In the embodiment of FIG. 1, the MMU is enabled during secure mode.

The S-IVT can be located anywhere in secure ROM, as illustrated by SIVT 430 in FIG. 4; therefore no hard coded address verification is done in the security state machine. Table 5 illustrates an SIVT for processor 200 of the present embodiment. In this table, it is assumed IVT[0] is the physical address in ROM corresponding to the first exception vector (reset) and IVT[x] is the physical address corresponding to IVT[0] +x byte. There is a vector for each of the six interrupt sources that branches to additional instructions within the table that perform operations to maintain security in response to the corresponding interrupt source.

TABLE 5

S-IVT description

| Physical address in ROM | Operation | Comment |
|---|---|---|
| IVT[0] | | Reset |
| IVT[4] | Branch IVT[undef] | Undefined instruction |
| IVT[8] | Branch IVT[swi] | SWI |
| IVT[12] | Branch IVT[Iabort] | Abort (prefetch) |
| IVT[16] | Branch IVT[Dabort] | Abort (data) |
| IVT[20] | | Reserved |
| IVT[24] | Branch IVT[irq] | IRQ |
| IVT[28] | Exception_id = 0x1C Branch to exception exit sequence | FIQ |
| IVT[undef] | Mask FIQ Exception_id = 0x04 Branch to exception exit sequence | Avoid nested interrupt Log the exception type |
| IVT[swi] | Mask FIQ Exception_id = 0x08 Branch to exception exit sequence or to SWI routine | SWI routine located in secure ROM |
| IVT[Iabort] | Mask FIQ Branch to Abort routine | Abort routine located in secure ROM |
| IVT[Dabort] | Mask FIQ Branch to abort routine | |
| IVT[irq] | Mask FIQ Exception_id = 0x18 Branch to exception exit sequence | |

The environmental setting sequence locks down and loads an instruction TLB (using CP15 prefetch Icache line instruction) with an updated translation for the exception vector virtual addresses corresponding to the location of the secure IVT in secure ROM. Once the interrupt vector table is re-mapped to the secure IVT, the environment setting sequence can re-enable the interrupts.

Figure 10:
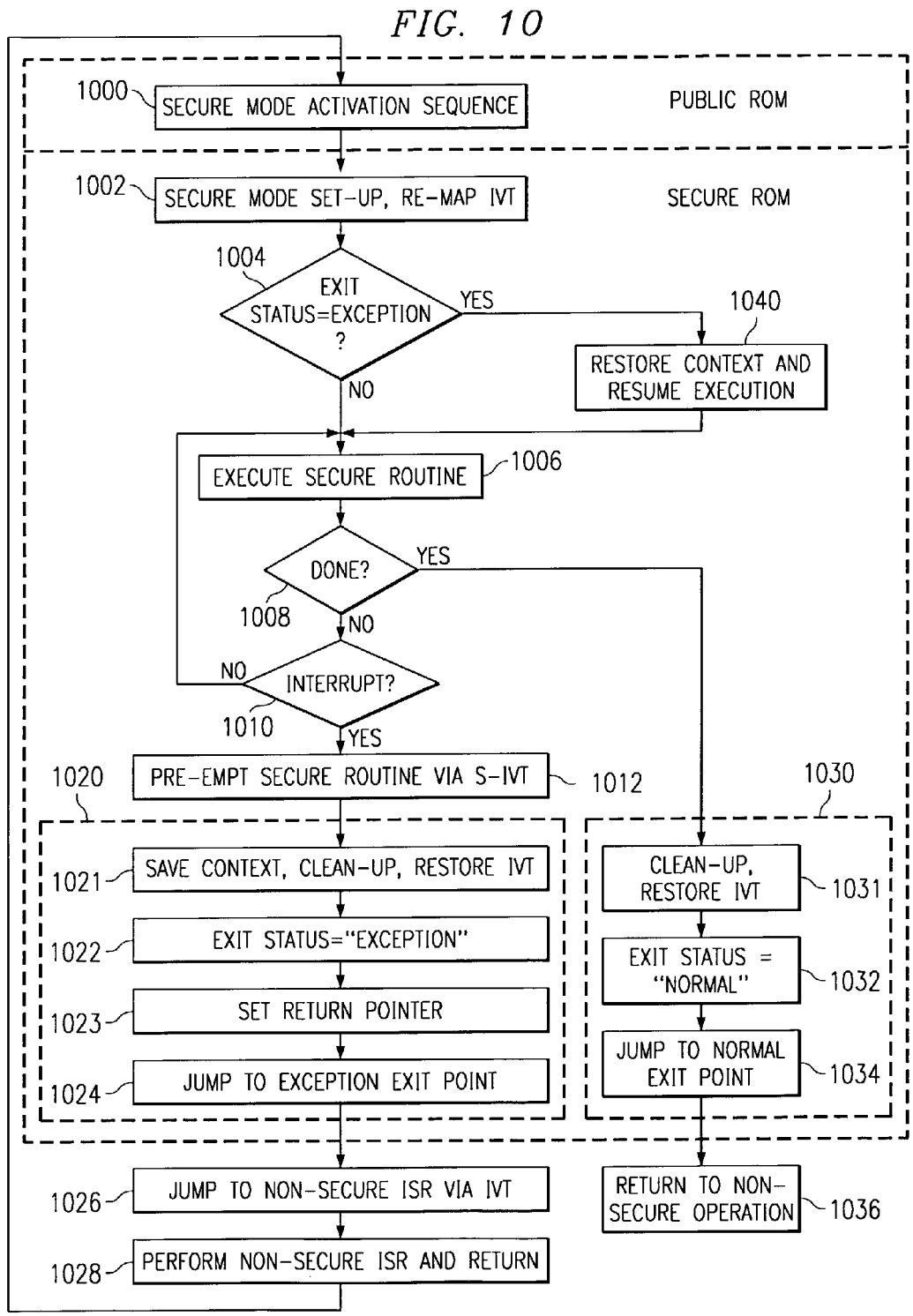
FIG. 10 is a flow chart illustrating interruptible execution while in a secure mode of operation in the system of FIG. 3.

FIG. 10 is a flow chart illustrating interruptible execution while in a secure mode of operation. This figure illustrates the case of exceptions generated by an event that are not part of secure application. This type of exception requires exiting the secure mode. As described above, secure mode is entered in step 1000 and the IVT is remapped to the SIVT during the environmental set-up in step 1002, as described above.

Step 1004 examines the exit_mode variable to determine the status of the last exit. If the last exit was due to an exception, then step 1040 is performed to restore state and resume the pre-empted secure operation. This will be described in more detail later. Otherwise, execution of a requested secure operation is started in step 1006 and continues until completed as indicated by steps 1008 and 1010.

During operation of the secure routine, an exception may occur as indicated at step 1010. When an exception occurs, the processor jumps to the corresponding secure exception vector in the secure interrupt vector table (S-IVT) in step 1012. From there, the processor is re-directed to an exception exit sequence 1020, that is also located in secure ROM. After the completion of the exit sequence, the processor will be directed to the original exception vector.

The exception exit sequence performs tasks necessary to protect any secret content being operated on by the requested secure routine and will ensure compliance with secure mode exit procedure. The task of the S-IVT and the exception exit sequence is not to handle the exception itself but only to manage the exit of the secure mode. Exiting the secure mode under interruption is one of the possible choices.

The exception exit sequence needs to perform several tasks in order to preserve security, including: comply with secure mode exit procedure, protect "secret" content on exit, allow control to be passed to the original interrupt vector for interrupt service routine (ISR) processing, and allow return from interrupt through entry point with proper context restored after completion of the ISR. The exception exit sequence can be located anywhere in secure ROM and is illustrated in FIG. 4 as part of exit sequence 418.

In step 1021, a secure context state is saved in secure SRAM and exit clean-up is performed. R0-R12 of processor 200 is pushed onto the secure stack and then registers R0-R12 are cleared. R0 is then loaded with an exception ID value. The secure stack pointer is then saved in secure SRAM and the original stack pointer replaced, as described earlier. Instruction and data caches are flushed, the write buffer is drained and secure entries in the TLB are unlocked. The TLB corresponding to the IVT page is then unlocked and flushed. This automatically re-maps the interrupt vector table to its original (OS) location In step 1022 the exit_mode variable is updated with a value "exception" to indicate that this exit from secure mode was in response to an exception.

In step 1023, the return address corresponding to the interrupted secure routine is stored in secure SRAM from register R14, the link register, of processor 200. R14 is then loaded with an appropriate return address, such that secure mode will be properly returned to upon completion of the ISR.

In step 1024 a series of NOPs is included at this point to allow read/write in secure SRAM/ROM to be completed before releasing the security bit and avoid a situation of race that would cause a fatal error. Then a branch to the exception exit point is performed. The exception exit point can be located anywhere in ROM outside the area protected by the secure bit; therefore no hard coded address check is needed in the secure state machine. When the security state machine detects a jump outside the protected zone of the ROM but still in the ROM address range, it simply releases the secure bit, as indicated by arc 621 of FIG. 6

Since the IVT was restored to its original location, the regular interrupt vector can be accessed. At the exception exit point address, NOPs are inserted before branching to the original exception vector. The NOPs are required in this embodiment to allow propagation time for the security signal to become inactive at the boundary of the secure memory and peripherals before starting to execute non-trusted code. The exception vector address can be computed by adding to the exception vector base location (0x000 000) the appropriate offset which is stored in register R0 as the exception ID value. The exception ID value is also used to restore the appropriate processor mode if it was changed during the entry sequence so that the processor branches to the exception vector with the corresponding processor mode.

After completion of the exception processing, a return is made to the interrupted secure routine. The return from interruption needs to be performed through the entry sequence.

In order to fully support interrupt operation, a return from an ISR should first be directed to a task manager that performs house-keeping tasks to place the system in an appropriate state for entry into a secure mode. This includes masking interrupts, setting security condition register 320 to disable the various resources that pose a security risk, and verifying that if memory management unit 210 is enabled, that a page table entry corresponding to the activation sequence is marked as "non-cacheable." This can be the same task manager as used in step 520 of FIG. 5, or it can be a separate one used just by exception processing.

The entry sequence restores the secure environment (cache, MMU, stack, . . . ) in steps 1000, 1002. When this is completed, the software reads the exit_mode variable in step 1004 and can detect that the previous secure mode session was interrupted. It is then simple to restore the processor context from the secure stack and to move the exception return address in the PC in step 1040 to resume the execution of the pre-empted task again in step 1006.

Special Cases

As described earlier, when a security violation, including reset itself, happens a global system reset is generated. One of the consequences of the reset is to flush the caches and disable the MMU. When the reset is released and the processor boots the caches are flushed but potentially still full of secret contents and the general-purpose registers are not affected by the reset and potentially still full of secret contents.

Since the reset flushed the cache by clearing validity bits, it is impossible for code running on processor to access the cache contents (or tag) after the reset. Furthermore, there is no way to cancel the invalidation since the validity bit can only be set by doing a cache line-fill. Using the embedded ICE/debug features would not change this. As a result, the boot code does not need to act specifically on the caches. Furthermore, the memory built in self-test structure (BIST) must not allow the cache RAM & TAG RAM contents to be read by JTAG. If that were the case, a JTAG debugger would be able to read the contents of the cache words, but because all of the bits would be marked as invalid, it would not be able to determine which was really correct data and which was not. It should be understood that in other embodiments, various ways and means may be provided for validating and invalidating a cache, and appropriate precautions must be taken to protect residual data in the cache.

However, as mentioned earlier, the processor general-purpose registers are not affected by the reset and potentially still full of secret contents. It is therefore mandatory to clear them specifically at boot time. As a result, one of the first operation the boot code needs to perform, after branching to the reset vector, is to clear all the 32 general purpose registers. Obviously, this needs to be done before FIQ and IRQ are enabled in the boot code.

The software interrupt (SWI) can be handled in two different ways. One way is to branch to the interruption exit sequence and results in an exit from the secure mode, as described above. This provides an additional way for the security software to exit secure mode. A second way is to not initiate exit from secure mode. The processor does not jump to the exception exit sequence but to a specific routine in secure ROM that will handle SWI without exiting the secure mode. This second way is the preferred option.

For aborts, as shown in the S-IVT in FIG. 4, when an abort occurs, the processor does not jump to the exception exit sequence but to an abort routine in secure ROM. In other words, the abort is handled in secure mode and will not initiate exit from secure mode.

Referring still to FIG. 10, if execution of the secure routine is not interrupted, then when the routine is done in step 1008 a normal exit sequence 1030 is performed. In step 1031 exit clean-up is performed by: masking interrupts; flushing instruction and data caches; draining write buffer; clearing all processor registers except those used to pass arguments; storing the secure Stack Pointers in secure SRAM; retrieving from secure SRAM the original stack pointer; unlocking all the TLB entries that were loaded with secure entries; unlocking and flushing the TLB corresponding to the IVT page which restore the interrupt vector table to its original (OS) location.

In step 1032 the exit_mode variable is updated with a value "normal" to indicate that this exit from secure mode was a normal completion.

In step 1034 a series of NOPs is included at this point to allow read/write in secure SRAM/ROM to be completed before releasing the security bit and avoid a situation of race that would cause a fatal error. Then a branch a normal exit point is performed. The normal exit point can be located anywhere in ROM outside the area protected by the secure bit; therefore no hard coded address check is needed in the secure state machine. When the security state machine detects a jump outside the protected zone of the ROM but still in the ROM address range, it simply releases the secure bit, as indicated by arc 621 of FIG. 6.

In step 1036 at the normal exit point, several NOPs are inserted before branching to the non-secure OS location that called the secure mode. The NOPs are required in this embodiment to allow propagation time for the security signal to become inactive at the boundary of the secure memory and peripherals before starting to execute non-trusted code.

Figure 11:
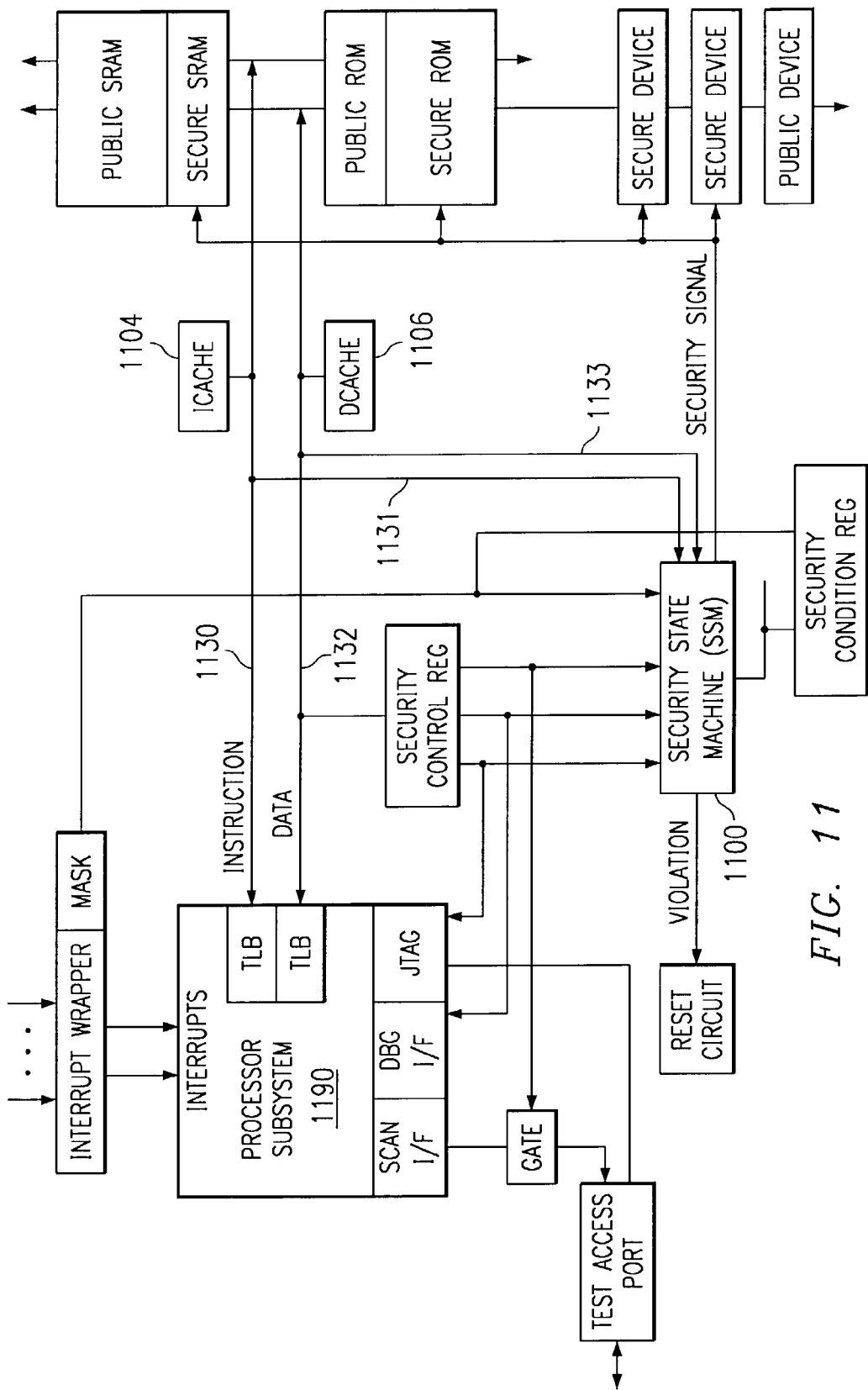
FIG. 11 is a block diagram of another embodiment of a system with distributed security circuitry.

FIG. 11 is a block diagram of another embodiment of a system with distributed security circuitry. In this embodiment, processor 1190 does not have an internal cache level, but instead has external caches 1104 and 1106. In this case, SSM 1100 can directly observe all instructions that are accessed, either from I-cache 1104 or from the various memory systems. Therefore, in this embodiment, entry condition two (see Table 1) that required the activation sequence be in non-cacheable memory can be relaxed.

In a similar manner, in other embodiments having various types of processors and varying configurations of buses, memories and peripherals, a security state machine can be configured to monitor a set of signals that will allow entry into a secure mode of operation without needing to intrude within the confines of a prepackaged processor or processor megacell.

In yet another embodiment, if access to internal signals of a processor is possible, then a security state machine can be constructed that may need to monitor a fewer number of signals in order to allow entry into a secure mode of operation.

System Embodiments

Several example systems that can benefit from aspects of the present invention are described in U.S. Pat. No. 5,072, 418, particularly with reference to FIGS. 2-18 of U.S. Pat. No. 5,072,418. A microprocessor incorporating an aspect of the present invention to provide a secure mode of operation can be used to further improve the systems described in U.S. Pat.

No. 5,072,418. Such systems include, but are not limited to, industrial process controls, automotive vehicle systems, motor controls, robotic control systems, satellite telecommunication systems. echo canceling systems, modems, video imaging systems, speech recognition systems, vocoder modem systems with encryption, and such.

Figure 12:
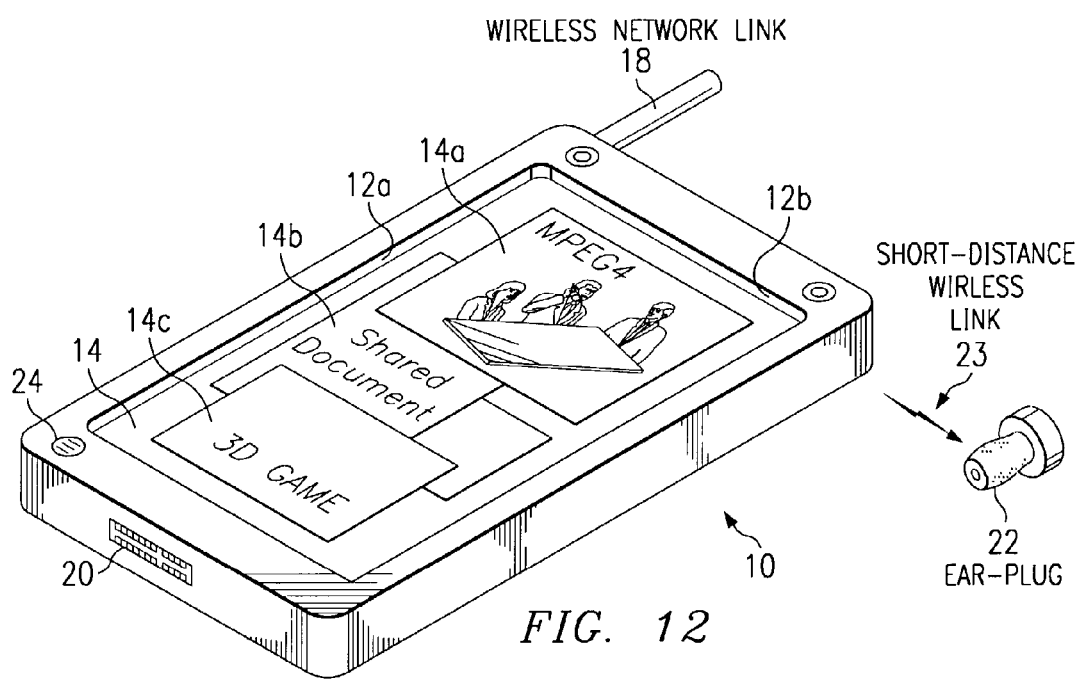
FIG. 12 illustrates a wireless personal digital assistant that includes an embodiment of the present invention.

FIG. 12 illustrates an exemplary implementation of an integrated circuit that embodies the present invention in a mobile telecommunications device, such as a mobile personal digital assistant (PDA) 10 with display 14 and integrated input sensors 12a, 12b located in the periphery of display 14. As shown in FIG. 12, digital system 10 includes a megacell 100 according to FIG. 1 that is connected to the input sensors 12a,b via an adapter (not shown), as an MPU private peripheral 142. A stylus or finger can be used to input information to the PDA via input sensors 12a,b. Display 14 is connected to megacell 100 via local frame buffer similar to frame buffer 136. Display 14 provides graphical and video output in overlapping windows, such as MPEG video window 14a, shared text document window 14b and three dimensional game window 14c, for example.

Radio frequency (RF) circuitry (not shown) is connected to an aerial 18 and is driven by megacell 100 as a DSP private peripheral 140 and provides a wireless network link. Connector 20 is connected to a cable adaptor-modem (not shown) and thence to megacell 100 as a DSP private peripheral 140 provides a wired network link for use during stationary usage in an office environment, for example. A short distance wireless link 23 is also "connected" to earpiece 22 and is driven by a low power transmitter (not shown) connected to megacell 100 as a DSP private peripheral 140. Microphone 24 is similarly connected to megacell 100 such that two-way audio information can be exchanged with other users on the wireless or wired network using microphone 24 and wireless earpiece 22.

Megacell 100 provides all encoding and decoding for audio and video/graphical information being sent and received via the wireless network link and/or the wire-based network link. Advantageously, megacell 100 also provides a secure mode of operation so that PDA 10 has a solution to address electronic commerce (e-commerce) and mobile commerce (m-Commerce) security issues within a mobile phone environment.

It is contemplated, of course, that many other types of communications systems and computer systems may also benefit from the present invention. Examples of such other computer systems include portable computers, smart phones, web phones, and the like. As security is also of concern in desktop and line-powered computer systems and micro-controller applications, particularly from a reliability standpoint, it is also contemplated that the present invention may also provide benefits to such line-powered systems.

Fabrication of digital system 100 involves multiple steps of implanting various amounts of impurities into a semiconductor substrate and diffusing the impurities to selected depths within the substrate to form transistor devices. Masks are formed to control the placement of the impurities. Multiple layers of conductive material and insulative material are deposited and etched to interconnect the various devices. These steps are performed in a clean room environment.

A significant portion of the cost of producing the data processing device involves testing. While in wafer form, individual devices are biased to an operational state and probe tested for basic operational functionality. The wafer is then separated into individual dice that may be sold as bare die or packaged. After packaging, finished parts are biased into an operational state and tested for operational functionality.

As used herein, the terms "applied," "connected," and "connection" mean electrically connected, including where additional elements may be in the electrical connection path. "Associated" means a controlling relationship, such as a memory resource that is controlled by an associated port. The terms assert, assertion, de-assert, de-assertion, negate and negation are used to avoid confusion when dealing with a mixture of active high and active low signals. Assert and assertion are used to indicate that a signal is rendered active, or logically true. De-assert, de-assertion, negate, and negation are used to indicate that a signal is rendered inactive, or logically false.

Thus, a digital system is provided with a secure mode ($3^{rd}$ level of privilege) built in a non-invasive way on a processor system that includes a processor core, instruction and data caches, a write buffer and a memory management unit. A secure execution mode is provided on a platform where the only trusted software is the code stored in ROM. In particular the OS is not trusted, and all native applications are not trusted.

Other aspects are:
   A secure execution mode that allows virtual addressing (MMU enabled);
   A secure execution mode that allows instruction and data cache to be enabled;
   A secure execution mode that allows all the system interruptions to be unmasked
   A secure mode that is entered through a unique entry point;
   A secure execution mode that can be dynamically entered and exit with full hardware assessment of the entry/exit conditions;
   A specific set of entry conditions that account for caches, write buffer and MMU being enabled;
   The structure of the activation sequence code accounts for caches, write buffer and MMU being enabled;
   The structure of the exit sequences code accounts for caches, write buffer and MMU being enabled;
   A specific way to manage a safe exit of secure mode under generic interruptions and allows return from interruption through entry point and activation sequence and a proper resuming of the secure execution;
   A specific way to manage the MMU in secure mode and provide data exchange between secure and non-secure environment.

Advantageously, OS state is retained and ISRs continue to function in secure mode.

While the invention has been described with reference to illustrative embodiments, this description is not intended to be construed in a limiting sense. Various other embodiments of the invention will be apparent to persons skilled in the art upon reference to this description. For example, all manner of processor types may be improved by using secure mode aspects described herein, such as for example: RISC, CISC, wide word, DSP, etc.

In another embodiment, the secure environment may be expanded to allow sharing of secure resources between several initiator resources, such as the DSP, for example. In such an embodiment, each initiator resource could be monitored by the security state machine to enforce the security principles described above.

In various embodiments, different complements of secure hardware can be provided, including various peripherals such as watchdog timers, encryption/decryption hardware accelerator, random number generator (RNG), etc; and various I/O devices such as keypad, LCD, touch-screen, etc.

Referring again to FIG. 1, in another embodiment, a second SSM can be embodied in DSP 104 to generate a security signal in a similar manner as on processor 102 for a secure software layer that executes on DSP 104. In this embodiment, a bused version of a security signal can be included within traffic control bus 110 so that individual transactions initiated by either processor 102 or DSP 104 can be given access to secure resources, such as certain of shared peripherals 116 in accordance with the security signal generated by the respective SSMs.

Referring again to FIG. 1, in another embodiment the security signal may be extended off megacell 100 so that level three resources can be operated in a secure manner.

The activation sequence, environment set-up sequence and exit sequences may be varied according to requirements of various embodiments. For example, different instruction pipeline lengths and different cache line lengths require variations in the activation sequence. In another embodiment, housekeeping tasks performed in step 520 could be included within the activation sequence.

It is therefore contemplated that the appended claims will cover any such modifications of the embodiments as fall within the true scope and spirit of the invention.

What is claimed is:

1. A method of operating a digital system having a mechanism for a CPU having an instruction execution pipeline to enter a secure mode of operation, comprising the steps of:
   jumping to an entry address at a particular address in an instruction memory;
   executing an activation sequence of a plurality of instructions beginning at the entry address; and
   entering the secure mode of operation only if the activation sequence of the plurality of instructions is fully executed by the CPU in a pre-defined order.

2. The method of claim 1 further comprising the step of not entering the secure mode of operation if the instruction jumping to the entry address is executed from an instruction cache.

3. The method of claim 1, wherein:
   the CPU operates in accordance with an instruction execution pipeline; and
   the activation sequence of the plurality of instructions is longer than the length of the instruction execution pipeline of the CPU.

4. The method of claim 1, wherein:
   the CPU operates in accordance with an instruction execution pipeline of predetermined length n; and
   the CPU has an instruction cache (I-cache) and wherein the activation sequence includes an I-cache flush instruction, such that at least n instructions of the activation sequence are executed before the I-cache flush instruction.

5. The method of claim 1, wherein:
   the CPU operates in accordance with an instruction execution pipeline of predetermined length n; and
   the CPU has an instruction cache (I-cache) and wherein the activation sequence includes an I-cache disable instruction, such that at least n instructions of the activation sequence are executed before the I-cache disable instruction.

6. The method of claim 1, wherein the last instruction of the activation sequence is a branch instruction and other than a cache flush instruction or a cache disable instruction, all other instructions in the activation sequence are NOP instructions.

7. A digital system, comprising:
   a CPU with an instruction execution pipeline;
   a public read only memory (ROM) connected to an instruction bus of the CPU for holding non-secure instructions, the public ROM being always accessible by the CPU;
   a secure ROM connected to the instruction bus of the CPU for holding secure instructions, the secure ROM being accessible only when a security signal is asserted;
   a security state machine (SSM) connected to the CPU for monitoring a set of status signals and connected to the instruction address bus for monitoring instruction address signals, the SSM having an output for asserting the security signal when a secure mode of operation is established; and
   wherein the SSM is operable to monitor execution of an activation sequence of a plurality of instructions located in public ROM by monitoring said instruction address signals and to enter the secure mode of operation only if the activation sequence of the plurality of instructions is executed by the CPU in a pre-defined order.

8. The digital system of claim 7 further comprising:
   an instruction cache;
   wherein said secure ROM has an entry address for beginning said secure mode;
   wherein said security state machine is further operable to not enter the secure mode of operation if an instruction within said activation sequence stored in said public ROM jumps to said entry address is executed from said instruction cache.

9. The digital system of claim 7, wherein:
   said CPU instruction execution pipeline has a predetermined length; and
   the activation sequence of instructions stored in said public ROM is longer than said predetermined length of said CPU instruction execution pipeline.

10. The digital system of claim 7, further comprising:
    an instruction cache coupled to said CPU;
    said CPU instruction execution pipeline has a predetermined length n; and
    wherein said activation sequence includes an I-cache flush instruction, such that at least n instructions of the activation sequence are executed before said I-cache flush instruction.

11. The digital system of claim 7, further comprising:
    an instruction cache coupled to said CPU;
    said CPU instruction execution pipeline has a predetermined length n; and
    wherein the activation sequence includes an I-cache disable instruction, such that at least n instructions of the activation sequence are executed before said I-cache disable instruction.

12. The digital system of claim 7, further comprising:
    an instruction cache coupled to said CPU;
    wherein a last instruction of the activation sequence is a branch instruction and other than a cache flush instruction or a cache disable instruction, all other instructions in the activation sequence are NOP instructions.

* * * * *